United States Patent
Li et al.

(10) Patent No.: US 10,484,206 B2
(45) Date of Patent: Nov. 19, 2019

(54) PATH DETECTION METHOD IN VXLAN, CONTROLLER, AND NETWORK DEVICE

(71) Applicant: Huawei Technologies Co., Ltd., Shenzhen (CN)

(72) Inventors: Lei Li, Suzhou (CN); Jinlei Su, Suzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/958,818

(22) Filed: Apr. 20, 2018

(65) Prior Publication Data
US 2018/0241586 A1    Aug. 23, 2018

Related U.S. Application Data

(63) Continuation of application No. PCT/CN2016/084748, filed on Jun. 3, 2016.

(30) Foreign Application Priority Data

Oct. 23, 2015 (CN) .......................... 2015 1 0697504

(51) Int. Cl.
*H04L 12/46* (2006.01)
*H04L 12/931* (2013.01)
(Continued)

(52) U.S. Cl.
CPC ...... *H04L 12/4675* (2013.01); *H04L 12/4633* (2013.01); *H04L 43/0811* (2013.01);
(Continued)

(58) Field of Classification Search
CPC ............ H04L 12/4641; H04L 12/4675; H04L 43/0811; H04L 45/02; H04L 45/26;
(Continued)

(56) References Cited

U.S. PATENT DOCUMENTS 6,771,662 B1 *   8/2004  Miki ................... H04L 49/3009
                                                        370/395.52
6,973,313 B1 * 12/2005  Sebastian ............... H04L 43/50
                                                        370/331
(Continued)

FOREIGN PATENT DOCUMENTS

CN    103401726 A    11/2013
CN    104247343 A    12/2014
(Continued)

OTHER PUBLICATIONS

Machine Translation and Abstract of Chinese Publication No. CN103401726, Nov. 20, 2013, 30 pages.
(Continued)

*Primary Examiner* — Dung B Huynh
(74) *Attorney, Agent, or Firm* — Conley Rose, P. C.

(57) ABSTRACT

A path detection method in a virtual extensible local area network (VxLAN), a controller, and a network device, where the controller constructs a detection packet according to a detection request and sends the detection packet to a source network device corresponding to a source VxLAN tunnel endpoint (VTEP). The source network device forwards, level by level, the detection packet to a destination network device corresponding to a destination VTEP, and reports information such as an Internet Protocol (IP) address, an outbound interface number, and an inbound interface number to the controller level by level. Therefore, a real service path may be detected.

9 Claims, 11 Drawing Sheets

(51) Int. Cl.
  *H04L 12/937* (2013.01)
  *H04L 12/751* (2013.01)
  *H04L 12/26* (2006.01)
  *H04L 12/721* (2013.01)

(52) U.S. Cl.
  CPC ............. *H04L 45/02* (2013.01); *H04L 45/26* (2013.01); *H04L 45/38* (2013.01); *H04L 49/254* (2013.01); *H04L 49/354* (2013.01); *H04L 12/4641* (2013.01); *H04L 2012/4629* (2013.01)

(58) Field of Classification Search
  CPC ..... H04L 45/38; H04L 49/254; H04L 49/354; H04L 12/18; H04L 12/4633; H04L 41/082; H04L 41/12; H04L 41/22; H04L 43/50; H04L 45/12; H04L 45/16; H04L 45/18; H04L 45/20; H04L 45/28; H04L 45/46; H04L 45/64; H04L 45/30; H04L 45/60; H04L 49/201; H04L 49/25; H04L 49/90; H04L 49/9063; H04L 61/103; H04L 61/2007; H04L 61/2061; H04L 61/6004; H04L 69/22; H04L 69/321; H04L 69/40
  See application file for complete search history.

(56) References Cited

U.S. PATENT DOCUMENTS

| | | | | |
|---|---|---|---|---|
| 7,400,596 | B1* | 7/2008 | Robertson | H04L 12/189 370/312 |
| 8,638,695 | B2* | 1/2014 | Zheng | H04L 45/00 370/254 |
| 8,705,527 | B1* | 4/2014 | Addepalli | H04W 4/046 370/389 |
| 9,112,708 | B1* | 8/2015 | Arad | H04L 12/18 |
| 9,699,030 | B1* | 7/2017 | Kumar | H04L 41/0853 |
| 10,103,902 | B1* | 10/2018 | Sampath | H04L 12/467 |
| 10,212,076 | B1* | 2/2019 | Morris | H04L 45/50 |
| 2002/0054596 | A1* | 5/2002 | Sengodan | H04L 12/64 370/395.21 |
| 2002/0152321 | A1* | 10/2002 | Le | H04L 29/06 709/238 |
| 2003/0103461 | A1* | 6/2003 | Jorgenson | H04L 41/142 370/241 |
| 2005/0094594 | A1* | 5/2005 | Roh | H04L 45/00 370/328 |
| 2005/0220011 | A1* | 10/2005 | Parker | H04L 47/10 370/229 |
| 2006/0120346 | A1* | 6/2006 | Kitamura | H04L 45/00 370/351 |
| 2006/0156018 | A1* | 7/2006 | Lauer | G06F 21/6218 713/182 |
| 2006/0268688 | A1* | 11/2006 | Isozu | H04L 45/26 370/227 |
| 2007/0082674 | A1* | 4/2007 | Pedersen | H04B 7/026 455/450 |
| 2007/0150614 | A1* | 6/2007 | Ramachandran | H04L 45/00 709/238 |
| 2007/0153782 | A1* | 7/2007 | Fletcher | H04J 3/1617 370/389 |
| 2007/0153808 | A1* | 7/2007 | Parker | H04L 12/4641 370/395.53 |
| 2007/0183416 | A1* | 8/2007 | Gooch | H04L 45/30 370/389 |
| 2010/0316052 | A1* | 12/2010 | Petersen | H04L 45/00 370/392 |
| 2012/0110152 | A1* | 5/2012 | Wing | H04L 12/4633 709/223 |
| 2012/0304313 | A1* | 11/2012 | Mao | H04L 63/101 726/29 |
| 2013/0266019 | A1* | 10/2013 | Qu | H04L 45/74 370/395.53 |
| 2013/0332602 | A1 | 12/2013 | Nakil et al. | |
| 2013/0343394 | A1* | 12/2013 | Li | H04L 12/4641 370/392 |
| 2014/0082195 | A1* | 3/2014 | Basso | H04L 63/101 709/225 |
| 2014/0098673 | A1 | 4/2014 | Lee et al. | |
| 2014/0140244 | A1* | 5/2014 | Kapadia | H04L 61/103 370/255 |
| 2014/0146817 | A1* | 5/2014 | Zhang | H04L 45/74 370/392 |
| 2014/0201136 | A1* | 7/2014 | Smid | G06F 21/62 707/610 |
| 2014/0348006 | A1* | 11/2014 | Jain | H04L 43/0811 370/245 |
| 2015/0009992 | A1* | 1/2015 | Zhang | H04L 49/354 370/392 |
| 2015/0016287 | A1* | 1/2015 | Ganichev | H04L 12/4633 370/252 |
| 2015/0049638 | A1* | 2/2015 | Hyoudou | H04L 45/38 370/254 |
| 2015/0055651 | A1* | 2/2015 | Shen | H04L 12/1854 370/390 |
| 2015/0124629 | A1* | 5/2015 | Pani | H04L 12/18 370/248 |
| 2015/0138952 | A1 | 5/2015 | Tamura et al. | |
| 2015/0200847 | A1* | 7/2015 | Gourlay | H04L 49/70 370/392 |
| 2015/0229724 | A1* | 8/2015 | Ray | H04L 12/4641 370/352 |
| 2015/0271084 | A1* | 9/2015 | Nakakes | H04L 47/286 370/392 |
| 2015/0278543 | A1* | 10/2015 | Zhang | G06F 16/13 707/784 |
| 2015/0280928 | A1* | 10/2015 | Tessmer | H04L 12/4641 370/390 |
| 2015/0281036 | A1 | 10/2015 | Sun et al. | |
| 2015/0341447 | A1* | 11/2015 | Patil | H04L 43/10 370/329 |
| 2016/0006655 | A1* | 1/2016 | Hyoudou | H04L 12/54 370/392 |
| 2016/0028557 | A1* | 1/2016 | Dong | H04L 12/4641 370/395.53 |
| 2016/0081005 | A1* | 3/2016 | Patil | H04W 40/24 370/329 |
| 2016/0087916 | A1* | 3/2016 | Janardhanan | H04L 63/1408 370/390 |
| 2016/0088083 | A1* | 3/2016 | Bharadwaj | H04L 43/02 709/217 |
| 2016/0112481 | A1* | 4/2016 | Pani | H04L 12/4633 370/390 |
| 2016/0142297 | A1* | 5/2016 | Parsa | H04L 45/46 370/392 |
| 2016/0149751 | A1* | 5/2016 | Pani | H04L 41/0668 370/221 |
| 2016/0274926 | A1* | 9/2016 | Narasimhamurthy | G06F 9/45558 |
| 2016/0285760 | A1* | 9/2016 | Dong | H04L 12/4666 |
| 2016/0294671 | A1* | 10/2016 | Liang | H04L 45/122 |
| 2016/0294769 | A1* | 10/2016 | Song | H04L 12/4641 |
| 2016/0315976 | A1* | 10/2016 | Detal | H04L 65/1069 |
| 2016/0344622 | A1* | 11/2016 | Liu | H04L 45/38 |
| 2016/0352633 | A1* | 12/2016 | Kapadia | H04L 45/64 |
| 2016/0359917 | A1* | 12/2016 | Rao | H04L 63/1425 |
| 2016/0366019 | A1* | 12/2016 | Pani | H04L 63/20 |
| 2016/0381015 | A1* | 12/2016 | Ravinutala | H04W 80/02 726/7 |
| 2017/0026245 | A1* | 1/2017 | Rao | H04L 45/02 |
| 2017/0026417 | A1* | 1/2017 | Ermagan | H04L 12/4641 |
| 2017/0033924 | A1* | 2/2017 | Jain | H04L 9/0819 |

(56) References Cited

U.S. PATENT DOCUMENTS

| | | | |
|---|---|---|---|
| 2017/0041209 A1* | 2/2017 | Joshi | H04L 45/64 |
| 2017/0085502 A1* | 3/2017 | Biruduraju | H04L 49/354 |

FOREIGN PATENT DOCUMENTS

| | | |
|---|---|---|
| CN | 104521196 A | 4/2015 |
| CN | 104685838 A | 6/2015 |
| CN | 104883303 A | 9/2015 |
| EP | 2928123 A1 | 10/2015 |
| WO | 2014189709 A1 | 11/2014 |

OTHER PUBLICATIONS

Machine Translation and Abstract of Chinese Publication No. CN104883303, Sep. 2, 2015, 6 pages.

"OpenFlow Switch Specification," Version 1.5.1 ( Protocol version 0x06 ), Mar. 26, 2015, 283 pages.

Mahalingam, M., et al., "Virtual eXtensible Local Area Network (VxLAN): A Framework for Overlaying Virtualized Layer 2 Networks over Layer 3 Networks," RFC7348, Aug. 2014, 22 pages.

Foreign Communication From a Counterpart Application, PCT Application No. PCT/CN2016/084748, English Translation of International Search Report dated Jul. 28, 2016, 2 pages.

Foreign Communication From a Counterpart Application, PCT Application No. PCT/CN2016/084748, English Translation of Written Opinion dated Jul. 28, 2016, 6 pages.

Pang, J., et al., "Path Detection in VXLAN Overlay Network," XP015109358, draft-pang-nvo3-vxlan-path-detection-01.txt, Oct. 19, 2015, 16 pages.

Foreign Communication From a Counterpart Application, European Application No. 16856619.8, Extended European Search Report dated Sep. 3, 2018, 8 pages.

Foreign Communication From a Counterpart Application, Chinese Application No. 201510697504.8, Chinese Office Action dated Mar. 4, 2019, 8 pages.

* cited by examiner

PATH DETECTION METHOD IN VXLAN, CONTROLLER, AND NETWORK DEVICE

CROSS-REFERENCE TO RELATED APPLICATIONS

This application is a continuation of International Patent Application No. PCT/CN2016/084748 filed on Jun. 3, 2016, which claims priority to Chinese Patent Application No. 201510697504.8 filed on Oct. 23, 2015. The disclosures of the aforementioned applications are hereby incorporated by reference in their entireties.

TECHNICAL FIELD

The present disclosure relates to the field of communications technologies, and in particular, to a path detection method in a virtual extensible local area network (VxLAN), a controller, and a network device.

BACKGROUND

Software-defined networking (SDN) is an implementation of network virtualization, and can separate a control plane from a data plane for a network device using OPENFLOW, thereby implementing flexible control on network traffic and making a network more intelligent as a pipeline.

VxLAN is an overlay network technology or a tunneling technology. In a VxLAN networking architecture, a data packet sent by a virtual machine (VM) is encapsulated in the User Datagram Protocol (UDP) using Internet Protocol (IP)/Media Access Control (MAC) of a physical network as an outer header (outer-header), and then transmitted in an IP network. After the data packet reaches a destination, a VxLAN tunnel endpoint (VTEP) decapsulates the data packet and sends data (the decapsulated data packet) to a target VM.

There is a demand for detecting a real service path of an IP service flow in a network. By means of current path detection based on a conventional network, whether a path in a virtual local area network (VLAN) is connected or disconnected can be detected, but an accurate network path cannot be detected for a virtualized network that uses VxLAN networking.

SUMMARY

Embodiments of the present disclosure provide a path detection method in a VxLAN, a controller, and a network device to resolve a problem that an actual service path cannot be detected in an existing VxLAN.

According to a first aspect, a path detection method in a VxLAN is provided, including constructing, by a controller, a detection packet according to a detection request inputted by a user, where the detection packet includes an identifier used to indicate a path detection service, an endpoint identifier of a source VTEP, an endpoint identifier of a destination VTEP, a source port value, a path detection type, and an IP address of a first network device corresponding to the endpoint identifier of the source VTEP, sending, by the controller, the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP, where the first reporting message includes the detection packet, the IP address of the first network device, and outbound and inbound interface numbers of the first network device, receiving, by the controller, a reporting message sent by each level of network device, where the reporting message includes the first reporting message and a second reporting message that is sent by the second network device, and obtaining, by the controller, a network path from the first network device to the second network device according to an IP address, an outbound interface number, and an inbound interface number in the reporting message sent by each level of network device.

In this way, the controller constructs the detection packet according to the detection request. The network device forwards the detection packet level by level, and reports, to the controller level by level, the IP address and the numbers of outbound and inbound interfaces through which the detection packet passes. Therefore, a real service path can be detected.

With reference to the first aspect, in a first possible implementation of the first aspect, the detection request includes an IP address of a source VM, an IP address of a destination VM, and a protocol type identifier, and constructing, by a controller, a detection packet according to a detection request inputted by a user includes capturing, by the controller, a target packet according to the IP address of the source VM, the IP address of the destination VM, and the protocol type identifier in the detection request, obtaining, by the controller, a port number of the source VM of the target packet and a port number of the destination VM of the target packet to obtain 5-tuple information, where the 5-tuple information includes the IP address of the source VM, the IP address of the destination VM, the protocol type identifier, the port number of the source VM, and the port number of the destination VM, determining, by the controller, the source port value according to the 5-tuple information, determining, by the controller, the endpoint identifier of the source VTEP according to the IP address of the source VM, determining the endpoint identifier of the destination VTEP according to the IP address of the destination VM, obtaining, by the controller, the IP address of the first network device corresponding to the endpoint identifier of the source VTEP, and determining, by the controller according to the detection request, that the path detection type is path detection between VMs.

In this way, the controller captures a packet according to the detection request inputted by the user, obtains the 5-tuple information of the packet, constructs, according to the 5-tuple information, a detection packet that has a same packet header as a packet used in a real service to simulate the real service to perform level-by-level forwarding. The IP address and the numbers of outbound and inbound interfaces through which the detection packet passes are reported to the controller level by level. Therefore, a real service path between the source VM and the destination VM can be detected.

With reference to the first aspect, in a second possible implementation of the first aspect, the detection request includes the endpoint identifier of the source VTEP and the endpoint identifier of the destination VTEP, and constructing, by a controller, a detection packet according to a detection request inputted by a user includes setting, by the controller, the source port value, where the source port value progressively increases according to a sum of an expected quantity of paths between the source VTEP and the destination VTEP and a specified margin quantity, the expected quantity of paths is a path quantity known to the user, the specified margin quantity is a quantity that is specified when path detection is performed and that is greater than the expected quantity of paths, and the specified margin quantity is a positive integer, and determining, by the controller according to the detection request, that the path detection type is path detection between VTEPs.

The controller constructs the detection packet according to the endpoint identifiers of the source VTEP and the destination VTEP that are inputted by the user. The network device forwards the detection packet level by level, and reports, to the controller level by level, the IP address and the numbers of outbound and inbound interfaces through which the detection packet passes. Therefore, multiple real service paths between the source VTEP and the destination VTEP can be detected.

With reference to the first aspect, the first possible implementation of the first aspect, or the second possible implementation of the first aspect, in a third possible implementation of the first aspect, the reporting message further includes a hop count, and the obtaining, by the controller, a network path from the first network device to the second network device according to an IP address, an outbound interface number, and an inbound interface number in the reporting message sent by each level of network device includes screening out, by the controller according to the reporting message sent by each level of network device, one pair of outbound interface number and inbound interface number from multiple reporting messages that include a same IP address and a same hop count, where hop counts in the reporting messages sent by all levels of network devices progressively and sequentially decrease from the first network device corresponding to the endpoint identifier of the source VTEP to the second network device corresponding to the endpoint identifier of the destination VTEP, sorting, by the controller according to the hop count in the reporting message sent by each level of network device, all groups that are obtained after screening and that are of IP addresses, outbound interface numbers, and inbound interface numbers, and obtaining, by the controller, the network path according to each group that is obtained after screening and sorting and that is of an IP address, an outbound interface number, and an inbound interface number.

The reported outbound interface numbers and inbound interface numbers of the network device are screened according to the IP address of the network device. This can avoid repeated outbound interface numbers and inbound interface numbers of the network device on the network path. The outbound interface numbers and inbound interface numbers of all levels of network devices are sorted according to the hop counts. Therefore, a precedence relationship of all levels of network devices through which the detection packet passes can be obtained accurately, and a real network path can be restored.

With reference to the third possible implementation of the first aspect, in a fourth possible implementation, the detection packet further includes a detection instance identifier, and the detection instance identifier is used to identify different path detection, and the method further includes recording, by the controller, a received IP address, outbound interface number, and inbound interface number of each network path according to the detection instance identifier.

The detection instance identifier is set in the detection packet. Therefore, multiple network paths or multiple types of network paths can be detected at the same time.

With reference to the first aspect, the first possible implementation of the first aspect, the second possible implementation of the first aspect, the third possible implementation of the first aspect, or the fourth possible implementation of the first aspect, in a fifth possible implementation of the first aspect, the method further includes outputting the detected network path.

The detected network path is outputted in a user interface of the controller such that the user can visually know each level of network device through which the detection packet passes.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation of the first aspect, the method further includes obtaining, by the controller according to the detected network path, a status of the network path, where the status of the network path includes a connected state, a disconnected state, and a looped state.

The status of the network path is directly obtained. Therefore, a direct conclusion on the status of the network path can be provided for the user, and the user does not need to check whether a path between all levels of network devices through which the detection packet passes is connected, disconnected, or looped.

According to a second aspect, a path detection method in a VxLAN is provided, including receiving, by a network device, a detection packet, where the detection packet is constructed by a controller according to a detection request inputted by a user, and the detection packet includes an identifier used to indicate a path detection service, an endpoint identifier of a source VTEP, an endpoint identifier of a destination VTEP, a source port value, a path detection type, and an IP address of a source network device corresponding to the endpoint identifier of the source VTEP, determining, by the network device according to the endpoint identifier of the destination VTEP, whether the network device is a destination network device corresponding to the endpoint identifier of the destination VTEP, and generating, by the network device, a reporting message according to the detection packet, and sending the reporting message to the controller if the network device is the destination network device corresponding to the endpoint identifier of the destination VTEP, or replicating, by the network device, the detection packet, generating a reporting message, sending the reporting message to the controller, and forwarding the detection packet till the detection packet reaches the destination network device if the network device is not the destination network device corresponding to the endpoint identifier of the destination VTEP, where the reporting message includes the detection packet, an IP address of the network device, and numbers of an outbound interface and an inbound interface that are of the network device and through which the detection packet passes.

The network device forwards, level by level, the detection packet that is constructed by the controller according to the detection request, and reports, to the controller level by level, the IP address and the numbers of outbound and inbound interfaces through which the detection packet passes. Therefore, the controller can find a real service path by means of detection.

With reference to the second aspect, in a first possible implementation of the second aspect, after receiving, by a network device, a detection packet, the method further includes identifying the received detection packet according to the identifier used to indicate the path detection service, and obtaining, according to a stored correspondence between the detection packet and an execution action in an access control list (ACL) or a flow table that is preset or that is sent by the controller, an execution action corresponding to the detection packet, where the execution action includes replicating and/or forwarding the detection packet, and sending the reporting message to the controller.

Once the network device identifies that the detection packet is received, the network device can learn, according to the stored correspondence between an identifier of a detection packet and an execution action in the ACL or the flow table, the execution action to be performed after the detection packet is received, and then directly perform the execution action. This simplifies a processing procedure.

According to a third aspect, a controller is provided. The controller has a function of implementing a behavior of the controller in the foregoing methods. The function may be implemented by hardware, or may be implemented by hardware executing corresponding software. The hardware or software includes one or more modules corresponding to the foregoing function.

In a possible implementation, the controller includes a processor, a receiver, and a transmitter, where the processor is configured to construct a detection packet according to a detection request inputted by a user, where the detection packet includes an identifier used to indicate a path detection service, an endpoint identifier of a source VTEP, an endpoint identifier of a destination VTEP, a source port value, a path detection type, and an IP address of a first network device corresponding to the endpoint identifier of the source VTEP, the transmitter is configured to send the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP, where the first reporting message includes the detection packet, the IP address of the first network device, and outbound and inbound interface numbers of the first network device, the receiver is configured to receive a reporting message sent by each level of network device, where the reporting message includes the first reporting message and a second reporting message that is sent by the second network device, and the processor is further configured to obtain a network path from the first network device to the second network device according to an IP address, an outbound interface number, and an inbound interface number in the reporting message sent by each level of network device.

In another possible implementation, the controller includes a construction module configured to construct a detection packet according to a detection request inputted by a user, where the detection packet includes an identifier used to indicate a path detection service, an endpoint identifier of a source VTEP, an endpoint identifier of a destination VTEP, a source port value, a path detection type, and an IP address of a first network device corresponding to the endpoint identifier of the source VTEP, a sending module configured to send the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP, where the first reporting message includes the detection packet, the IP address of the first network device, and outbound and inbound interface numbers of the first network device, a receiving module configured to receive a reporting message sent by each level of network device, where the reporting message includes the first reporting message and a second reporting message that is sent by the second network device, and an obtaining module configured to obtain a network path from the first network device to the second network device according to an IP address, an outbound interface number, and an inbound interface number in the reporting message sent by each level of network device.

According to a fourth aspect, a network device is provided. The network device has a function of implementing a behavior of the network device in the foregoing methods. The function may be implemented by hardware, or may be implemented by hardware executing corresponding software. The hardware or software includes one or more modules corresponding to the foregoing function.

In a possible implementation, the network device includes a processor, a receiver, and a transmitter, where the receiver is configured to receive a detection packet, where the detection packet is constructed by a controller according to a detection request inputted by a user, and the detection packet includes an identifier used to indicate a path detection service, an endpoint identifier of a source VTEP, an endpoint identifier of a destination VTEP, a source port value, a path detection type, and an IP address of a source network device corresponding to the endpoint identifier of the source VTEP, the processor is configured to determine, according to the endpoint identifier of the destination VTEP, whether the network device is a destination network device corresponding to the endpoint identifier of the destination VTEP, the processor is further configured to generate a reporting message according to the detection packet, and send the reporting message to the controller if the network device is the destination network device corresponding to the endpoint identifier of the destination VTEP, or the processor is further configured to replicate the detection packet and generate a reporting message if the network device is not the destination network device corresponding to the endpoint identifier of the destination VTEP, and the transmitter is configured to send the reporting message to the controller, and forward the detection packet till the detection packet reaches the destination network device, where the reporting message includes the detection packet, an IP address of the network device, and numbers of an outbound interface and an inbound interface that are of the network device and through which the detection packet passes.

In another possible implementation, the network device includes a receiving module configured to receive a detection packet, where the detection packet is constructed by a controller according to a detection request inputted by a user, and the detection packet includes an identifier used to indicate a path detection service, an endpoint identifier of a source VTEP, an endpoint identifier of a destination VTEP, a source port value, a path detection type, and an IP address of a source network device corresponding to the endpoint identifier of the source VTEP, a determining module configured to determine, according to the endpoint identifier of the destination VTEP, whether the network device is a destination network device corresponding to the endpoint identifier of the destination VTEP, a generation module configured to generate a reporting message according to the detection packet if the network device is the destination network device corresponding to the endpoint identifier of the destination VTEP, and a sending module configured to send the reporting message to the controller, where the generation module is further configured to replicate the detection packet and generate a reporting message if the network device is not the destination network device corresponding to the endpoint identifier of the destination VTEP, and the sending module is further configured to send the reporting message to the controller, and forward the detection packet till the detection packet reaches the destination network device, where the reporting message includes the detection packet, an IP address of the network device, and numbers of an outbound interface and an inbound interface that are of the network device and through which the detection packet passes.

According to the network path detection method, the controller, and the network device that are provided in the embodiments of the present disclosure, the controller constructs the detection packet according to the detection request. The network device forwards the detection packet level by level, and reports, to the controller level by level, the IP address and the numbers of outbound and inbound interfaces through which the detection packet passes. Therefore, a real service path can be detected.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
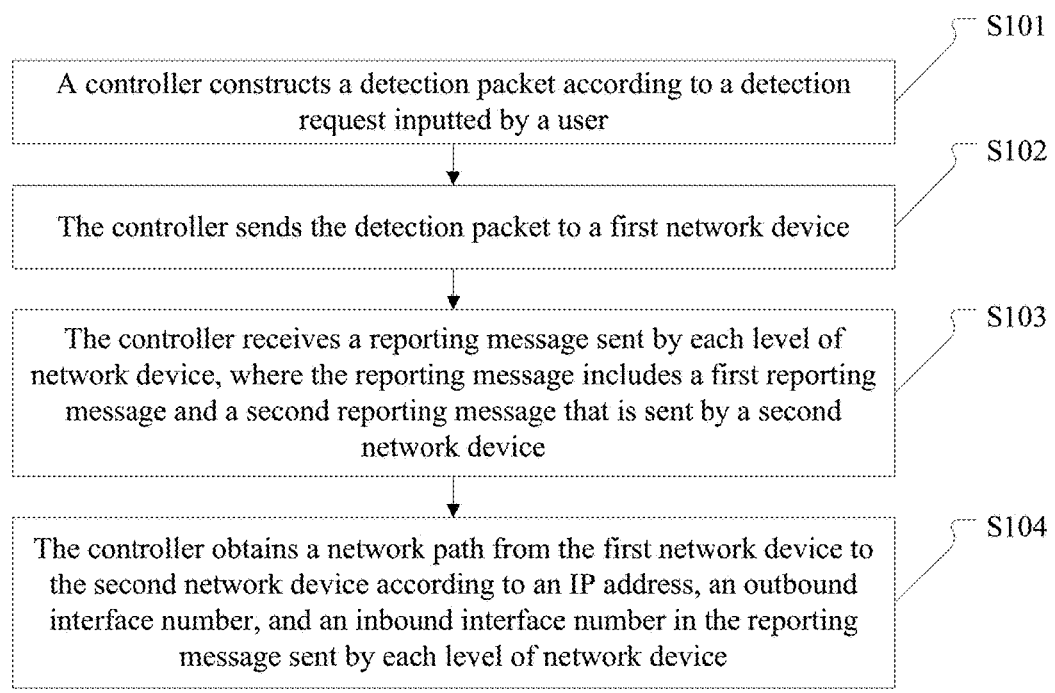
FIG. 1 is a schematic flowchart of a path detection method in a VxLAN according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In a VxLAN networking architecture, a data packet sent by a VM is encapsulated in the UDP using IP/MAC of a physical network as an outer-header, and then transmitted in a physical IP network. After the data packet reaches a destination, a VTEP decapsulates the data packet and sends data to a target VM. One VTEP may be mounted to multiple VMs. In the embodiments of the present disclosure, a controller may detect a single network path between two VMs, or may detect all network paths between two VTEPs. That is, the controller constructs a detection packet according to a detection request, and sends, using an OPENFLOW packet-out interface, the detection packet to a network device corresponding to a source VTEP, and the network device replicates the detection packet, and forwards the detection packet to a next level of network device. Each level of network device replicates and forwards the detection packet, and sends a reporting message to the controller using an OPENFLOW packet-in interface to report the detection packet, an IP address of the network device, and numbers of outbound and inbound interfaces through which the detection packet passes. The controller obtains, according to recorded outbound and inbound interface numbers of each level of network device, a detected network path. This can ensure consistency between a detected simulation path and an actual service path.

The embodiments of the present disclosure are based on an OPENFLOW network. The OPENFLOW network includes an OPENFLOW switch, a network virtualization layer (FlowVisor), and a controller. The OPENFLOW switch is a core component of the entire OPENFLOW network, implements separation between a data layer and a control layer, and mainly manages forwarding at the data layer. After receiving a data packet, the OPENFLOW switch first searches a local flow table for a target forwarding port. If there is no matching target forwarding port, the OPENFLOW switch forwards the data packet to the controller, and the control layer determines the forwarding port. In analog computer virtualization, the FlowVisor is a network virtualization layer between a hardware structure element and software. The FlowVisor allows multiple controllers to control one OPENFLOW switch at the same time, but each controller can control only a virtual network that passes through the OPENFLOW switch. The controller implements a function of the control layer, and controls the flow table in the OPENFLOW switch using the OPENFLOW protocol, thereby implementing centralized control on the entire network.

FIG. 1 is a schematic flowchart of a path detection method in a VxLAN according to an embodiment of the present disclosure. The method includes the following steps.

Step S101. A controller constructs a detection packet according to a detection request inputted by a user.

The controller is independent of a VM, a VTEP, and a network device. For example, in path detection shown in FIG. 2, the controller may be an agile network controller (AC). The controller may be a cluster, and data may be sent and received by any controller in the cluster. The controller has a human-machine interface, and can obtain the detection request inputted by the user. The detection request may be initiated using a packet that is specified and captured by the user in the human-machine interface and that needs to be used for network path detection, or may be initiated by inputting a source VTEP and a destination VTEP. One VTEP may be mounted to one or more VMs. Therefore, path detection in this application may be detection between two VMs, that is, single-path detection, or may be detection between two VTEPs, that is, multipath radar detection, that is, all possible paths between all VMs connected to the two VTEPs are detected.

When performing network path detection, the controller needs to construct the detection packet, and sends the detection packet to the network device to detect whether a path through which the detection packet passes is the same as that through which an actual packet passes. The detection packet includes an identifier used to indicate a path detection service, an endpoint identifier of the source VTEP, an endpoint identifier of the destination VTEP, a source port value, a path detection type, and an IP address of a first network device corresponding to the source VTEP. Herein, the path detection type includes path detection between VMs and path detection between VTEPs.

Step S102. The controller sends the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP.

The first reporting message includes the detection packet, the IP address of the first network device, and outbound and inbound interface numbers of the first network device.

In this embodiment of the present disclosure, a packet is delivered and received based on an OPENFLOW network, further, using an OPENFLOW packet-out interface and an OPENFLOW packet-in interface. The controller sends, using the packet-out interface, the constructed detection packet to the first network device corresponding to the source VTEP. Packet forwarding between network devices is automatically performed according to a source port value obtained by means of calculation. The network device herein is a layer-2 device or layer-3 device that supports a VxLAN, and may be a switch or a router.

The network device in this embodiment of the present disclosure further needs to replicate the detection packet when performing packet forwarding. This is because the network device in this embodiment of the present disclosure not only needs to forward the detection packet, but also needs to encapsulate the detection packet in a reporting message and send the reporting message to the controller. The first network device replicates the detection packet, generates the first reporting message, sends the first reporting message to the controller, and forwards the detection packet according to the source port value till the detection packet reaches a next level of network device of the first network device. Each level of network device repeatedly performs the step of replicating the detection packet, reporting the first reporting message, and forwarding the detection packet, till the second network device corresponding to the endpoint identifier of the destination VTEP receives the detection packet. The second network device only sends a second reporting message to the controller without replicating and forwarding the detection packet.

It should be noted that message content included in both the "first reporting message" and the "second reporting message" herein is the detection packet, an IP address of a network device sending the reporting message, a number of an inbound interface through which the detection packet passes when the detection packet is received, and a number of an outbound interface through which the detection packet passes when the detection packet is forwarded, where the inbound interface and the outbound interface are of the network device. The "first reporting message" and the "second reporting message" are defined to only differentiate whether the reporting message is sent by a network device corresponding to the endpoint identifier of the destination VTEP.

Step S103. The controller receives a reporting message sent by each level of network device, where the reporting message includes the first reporting message and a second reporting message that is sent by the second network device.

Packet forwarding between network devices is automatically performed according to a source port value obtained by means of calculation. Therefore, in other approaches, which path is used for packet forwarding between network devices is unknown. This problem needs to be resolved in this embodiment of the present disclosure. That is, the detection packet passes through each level of network device, and each level of network device sends a reporting message to the controller using a packet-in interface.

The controller may receive the reporting message sent by each level of network device. Therefore, the reporting message includes the first reporting message and the second reporting message that is sent by the second network device corresponding to the endpoint identifier of the destination VTEP. It should be noted that one network device has multiple interface numbers. Which interfaces of which network device the detection packet is received and sent from need to be determined herein.

Step S104. The controller obtains a network path from the first network device to the second network device according to an IP address, an outbound interface number, and an inbound interface number in the reporting message sent by each level of network device.

After receiving the IP address, outbound interface number, and inbound interface number of each level of network device, the controller may obtain, according to the interface numbers, the detected network path, that is, learn which network devices the constructed detection packet passes through in sequence.

Figure 2:
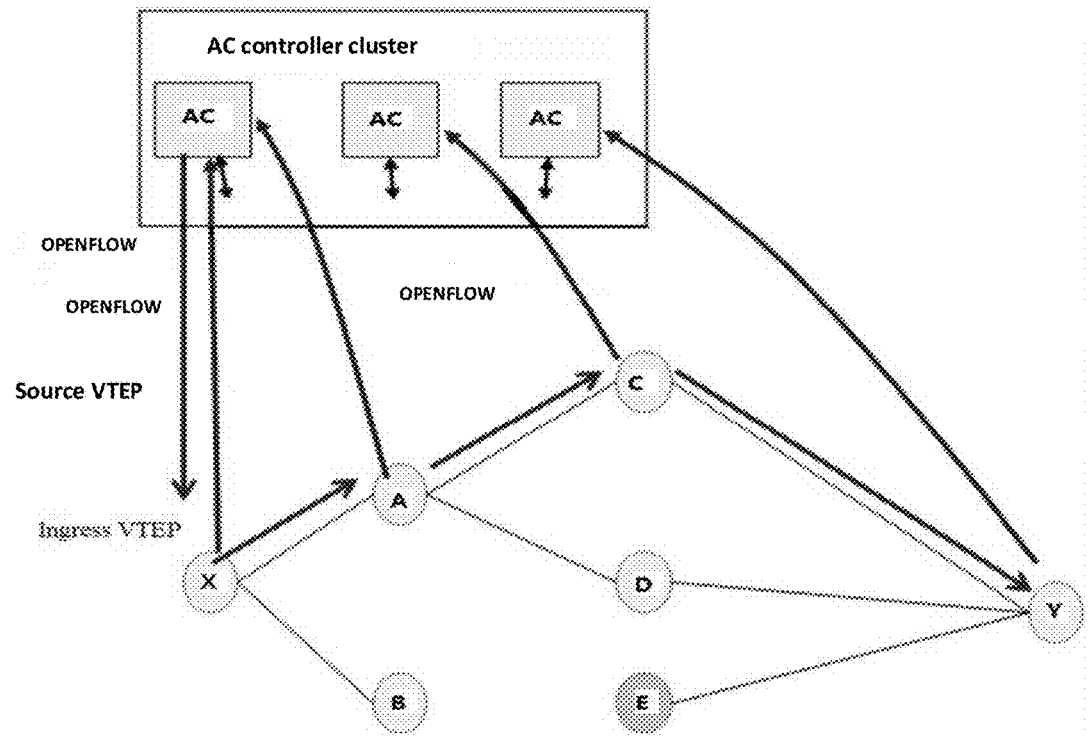
FIG. 2 is a schematic diagram of path detection according to an embodiment of the present disclosure.

As shown in FIG. 2, an AC controller cluster sends, using an OPENFLOW architecture, a detection packet to a node X corresponding to a source VTEP. The node X replicates the detection packet, generates a reporting message, forwards the detection packet to a node A, and sends the reporting message to the AC controller cluster. Then, nodes A, C, and Y repeatedly perform the step of replicating the detection packet, forwarding the detection packet, and sending the reporting message. In this way, after forwarding the detection packet is completed, the AC controller cluster may learn, according to the received reporting messages, a path through which the detection packet passes, for example, X-A-C-Y. The nodes herein are network devices.

In the path detection method in a VxLAN according to this embodiment of the present disclosure, the controller constructs the detection packet according to the detection request. The network device forwards the detection packet level by level, and reports, to the controller level by level, the IP address and the numbers of outbound and inbound interfaces through which the detection packet passes. Therefore, a real service path can be detected.

Figure 3A:
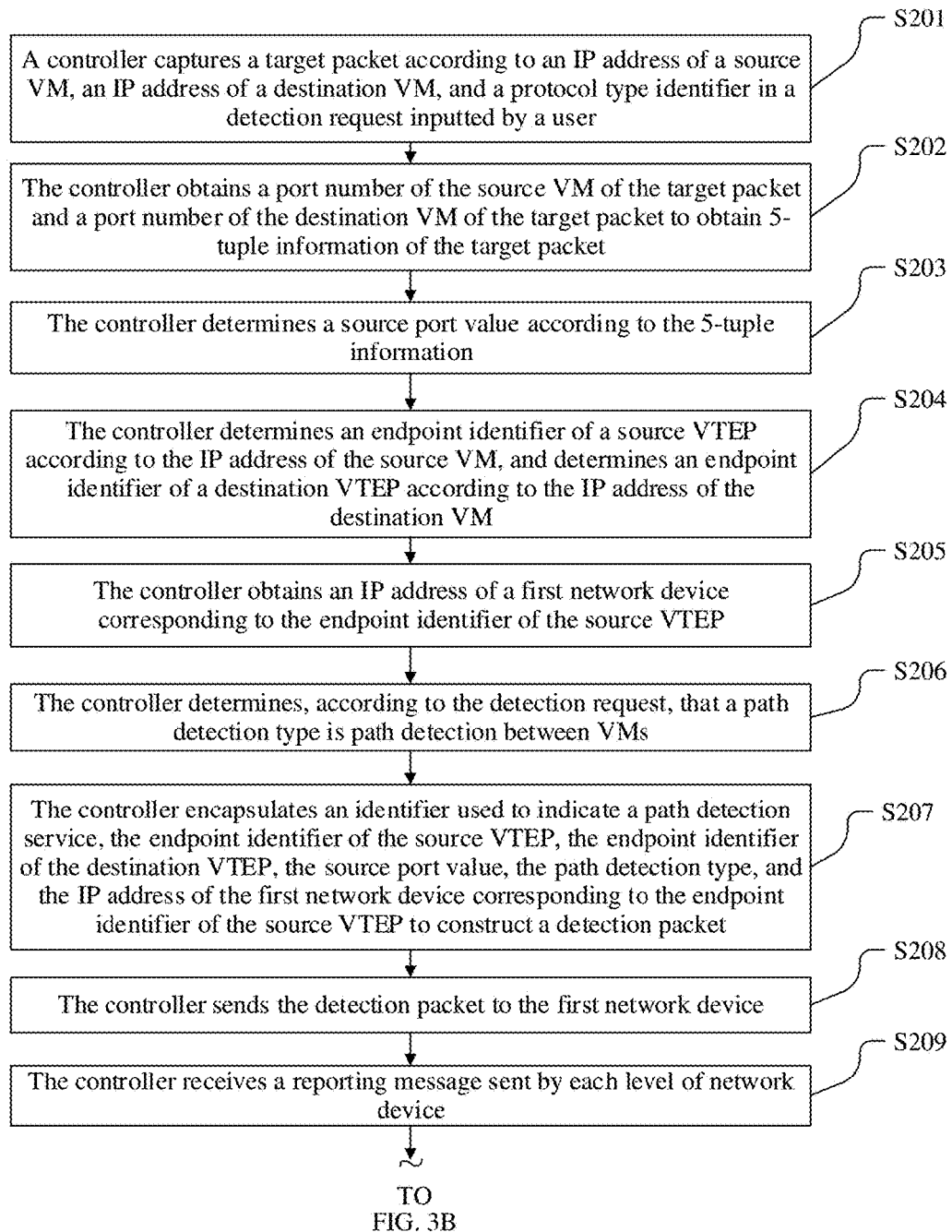
FIG. 3A and FIG. 3B are a schematic flowchart of an inter-VM path detection method according to an embodiment of the present disclosure.
Figure 3B:
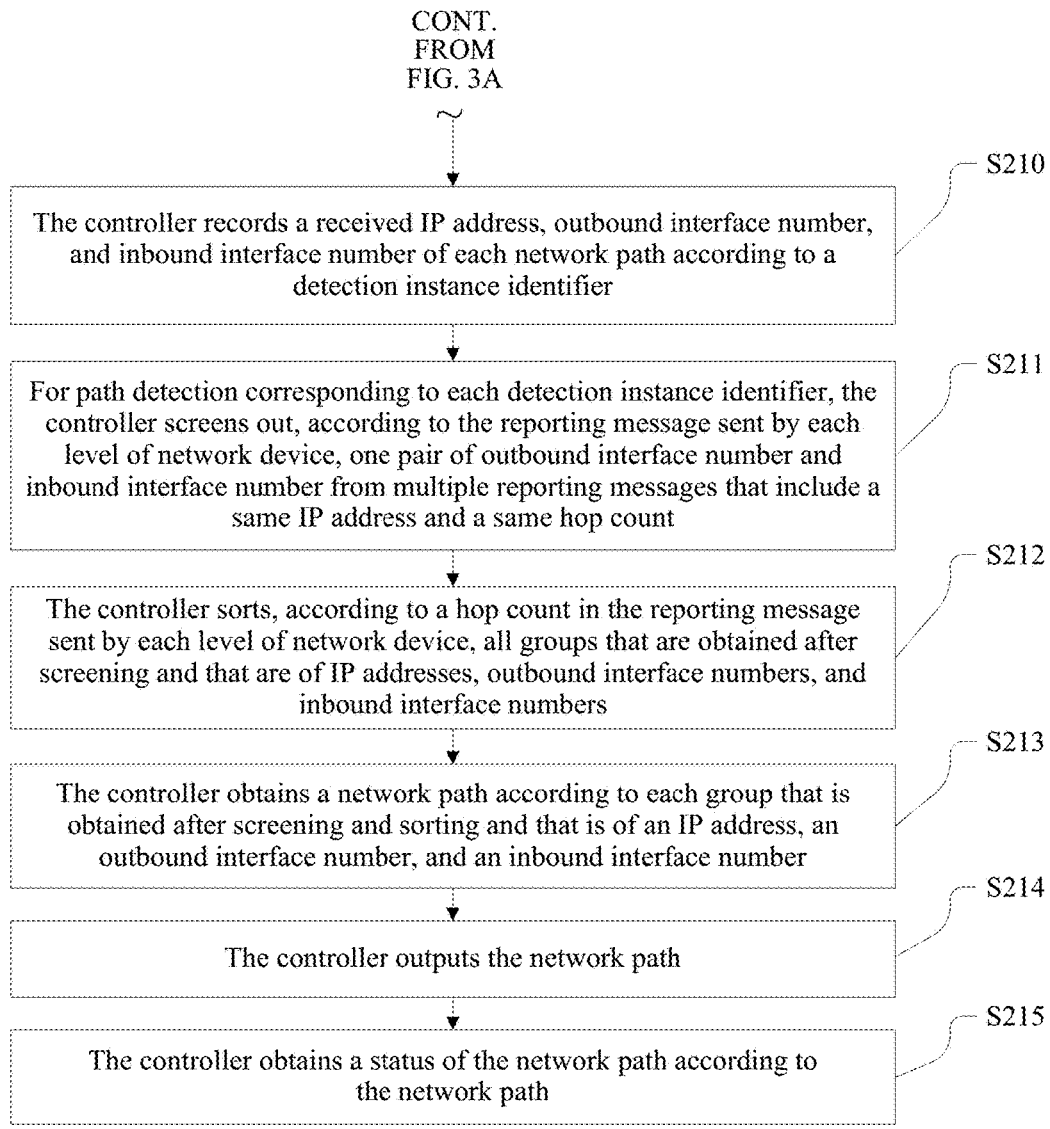

FIG. 3A and FIG. 3B are a schematic flowchart of an inter-VM path detection method according to an embodiment of the present disclosure. The method includes the following steps.

Step S201. A controller captures a target packet according to an IP address of a source VM, an IP address of a destination VM, and a protocol type identifier in a detection request inputted by a user.

This embodiment relates to network path detection between VMs. The user may instruct, by inputting an IP address of a source VM of a to-be-detected packet, an IP address of a destination VM of the to-be-detected packet, and a protocol type identifier, the controller to capture the target packet. The source VM and the destination VM of the packet are VMs mounted to a source VTEP and a destination VTEP respectively.

Step S202. The controller obtains a port number of the source VM of the target packet and a port number of the destination VM of the target packet to obtain 5-tuple information of the target packet.

After capturing the packet, the controller may obtain the port number of the source VM of the packet and the port number of the destination VM of the packet, to obtain the 5-tuple information of the target packet. The 5-tuple information includes the IP address of the source VM, the IP address of the destination VM, the protocol type identifier, the port number of the source VM, and the port number of the destination VM. After obtaining the 5-tuple information of the packet, the controller triggers path detection of the packet.

Step S203. The controller determines a source port value according to the 5-tuple information.

The controller may calculate, according to 5-tuple data, a source port value using hash, fill the value into a detection packet, and then forward the detection packet for path detection. Subsequently, on each hop of network device that the detection packet reaches, a path is selected according to the source port value. A network path has a unique source port value. For single-path detection, only one source port value can be calculated according to one piece of 5-tuple data.

Step S204. The controller determines an endpoint identifier of a source VTEP according to the IP address of the source VM, and determines an endpoint identifier of a destination VTEP according to the IP address of the destination VM.

Because each VM is mounted to a VTEP by the user using the controller, the controller stores a correspondence between a VTEP and a VM mounted to the VTEP. Therefore, the controller can determine, according to the IP address of the source VM and the IP address of the destination VM, the endpoint identifier of the source VTEP corresponding to the source VM and the endpoint identifier of the destination VTEP corresponding to the destination VM, respectively. The source and destination VTEPs are used to determine the first and last network devices of a detection packet.

Step S205. The controller obtains an IP address of a first network device corresponding to the endpoint identifier of the source VTEP.

The controller also pre-stores a correspondence between a VTEP and a connected network device. Therefore, the IP address of the first network device can also be obtained according to the endpoint identifier of the source VTEP.

Step S206. The controller determines, according to the detection request, that a path detection type is path detection between VMs.

The detection request includes the 5-tuple information of the packet captured by the user. Therefore, it can be determined that the path detection is to perform simulation detection on the packet, that is, detection on a single packet or a single path, which is also referred to as path detection between VMs.

Step S207. The controller encapsulates an identifier used to indicate a path detection service, the endpoint identifier of the source VTEP, the endpoint identifier of the destination VTEP, the source port value, the path detection type, and the IP address of the first network device corresponding to the endpoint identifier of the source VTEP to construct a detection packet.

After obtaining the foregoing information, the controller may construct the detection packet, that is, encapsulate the foregoing information for transmission on an OPENFLOW network. The path detection between VMs is used for diagnosis of a path of a specified service flow.

Figure 4:
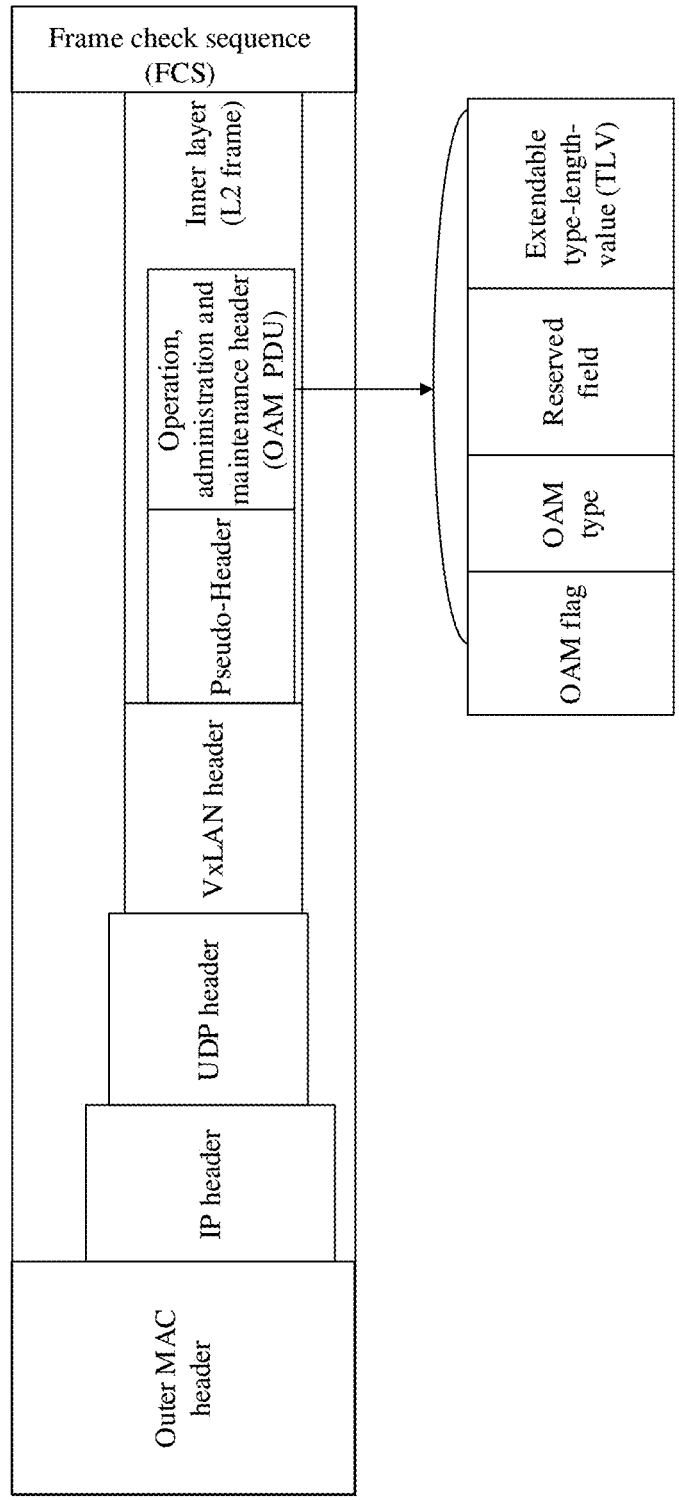
FIG. 4 is a schematic diagram of a format of a detection packet according to an embodiment of the present disclosure.

In this embodiment, a VxLAN format is used to encapsulate the detection packet. As shown in FIG. 4, a format of the detection packet includes fields, that is, an outer MAC header, an IP header, a UDP header, and a VxLAN header. Other fields are packet content. A bit of a reserved field in the VxLAN header, for example, the last bit of the reserved field, is used as the identifier used to indicate the path detection service. The packet content (a layer-2 frame) includes a pseudo-header and an operation, administration and maintenance (OAM) header (OAM PDU). The pseudo-header is used to ensure that traffic is processed according to a forwarding pipeline selection result. The OAM header follows the pseudo-header and includes an OAM flag, an OAM type, a reserved field, and an extendable type-length-value (TLV). The OAM flag is used to identify the OAM header, and is of 32 bits. A value of the OAM flag is 0xFFFFFFFF. The OAM type is used to identify the path detection type, and is of one byte. In this embodiment of the present disclosure, 0x1 indicates full-path detection between VTEPs, 0x2 indicates single-path detection between VMs, and other values are reserved. The extendable TLV is used to carry the IP address, an inbound interface number, an outbound interface number, and the like that are of the first network device. Certainly, the extendable TLV may further include another field, for example, a detection instance identifier. The detection instance identifier is used to identify different network path detection.

Step S208. The controller sends the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP.

Packet forwarding between network devices is automatically performed according to a source port value obtained by means of calculation. Therefore, in the other approaches, which path is used for packet forwarding between network devices is unknown. This problem needs to be resolved in this embodiment of the present disclosure. That is, the detection packet passes through each level of network device, and each level of network device sends a reporting message to the controller using a packet-in interface.

The first network device replicates the detection packet, generates the first reporting message, sends the first reporting message to the controller, and forwards the detection packet according to the source port value till the detection packet reaches a next level of network device of the first network device. Each level of network device repeatedly performs the step of replicating the detection packet, reporting the first reporting message, and forwarding the detection packet, till the second network device corresponding to the endpoint identifier of the destination VTEP receives the detection packet. The second network device only sends a second reporting message to the controller without replicating and forwarding the detection packet.

Step S209. The controller receives a reporting message sent by each level of network device, where the reporting message includes the first reporting message and a second reporting message that is sent by the second network device.

The controller may receive the first reporting message sent by each level of network device and the second reporting message that is sent by the second network device corresponding to the endpoint identifier of the destination VTEP. Therefore, the reporting message includes the first reporting message and the second reporting message that is sent by the second network device. The reporting message includes the replicated detection packet, an IP address of a network device sending the reporting message, an inbound interface number of a network device receiving the detection packet, and an outbound interface number of a network device forwarding the detection packet and/or sending the reporting message. It should be noted that one network device has multiple interface numbers. Which interfaces of which network device the detection packet is received and sent from need to be determined herein.

For the single-path detection in this embodiment, only one source port value is calculated. Therefore, when the controller receives the reporting message sent by the second network device corresponding to the endpoint identifier of the destination VTEP, it may be determined that the path detection is completed.

Alternatively, whether the path detection is completed may be determined by setting a path detection time. If the set time arrives, it may be considered that the path detection is completed. Alternatively, whether the path detection is completed may be determined according to whether the reporting message sent by the second network device corresponding to the destination VTEP is received and a hop count of the path detection. If the reporting message sent by the second network device corresponding to the destination VTEP is received and hops corresponding to network devices sequentially decrease level by level, it may be considered that the path detection is completed, otherwise, it may be considered that the path detection is not ended or fails even if a reporting message sent by a network device corresponding to the destination VTEP is received but hops corresponding to network devices do not sequentially decrease level by level, or all required hops are not included.

Step S210. The controller records a received IP address, outbound interface number, and inbound interface number of each network path according to a detection instance identifier.

The controller may detect multiple network paths at the same time. Therefore, multiple detection instances are available. For detection of each network path, a detection instance identifier needs to be set. The detection instance identifier is included in the extendable TLV field. The detection instance identifier is used to identify different network path detection of a packet. The controller records a received outbound interface number and inbound interface number of each level of network device according to the detection instance identifier included in the received detection packet.

Step S211. For path detection corresponding to each detection instance identifier, the controller screens out, according to the reporting message sent by each level of network device, one pair of outbound interface number and inbound interface number from multiple reporting messages that include a same IP address and a same hop count.

A network device may repeatedly report a message. Therefore, received outbound interfaces and inbound interfaces of a same network device corresponding to a same hop count need to be screened, and only one pair of outbound interface number and inbound interface number of a network device corresponding to the IP address is reserved. Hop counts in the reporting messages sent by all levels of network devices progressively and sequentially decrease from the first network device corresponding to the endpoint identifier of the source VTEP to the second network device corresponding to the endpoint identifier of the destination VTEP.

Step S212. The controller sorts, according to a hop count in the reporting message sent by each level of network device, all groups that are obtained after screening and that are of IP addresses, outbound interface numbers, and inbound interface numbers.

The reporting message may further include the hop count, for example, a time to live (TTL). The hop count decreases by 1 each time a packet passes through a network device during packet forwarding. Therefore, received outbound interface and inbound interface numbers that are obtained after screening and that are of all levels of network devices may be sorted according to the hop counts.

Step S213. The controller obtains the network path according to each group that is obtained after screening and sorting and that is of an IP address, an outbound interface number, and an inbound interface number.

After screening and sorting, the obtained network path is a network path having a clear and unique topological relationship.

Reported outbound interface numbers and inbound interface numbers of a network device are screened according to an IP address of the network device and a hop count. This can avoid repeated outbound interface numbers and inbound interface numbers of the network device on a network path. Outbound interface numbers and inbound interface numbers of all levels of network devices are sorted according to hop counts. Therefore, a precedence relationship of all levels of network devices through which a detection packet passes can be obtained accurately, and a real network path can be restored.

Step S214. The controller outputs the network path.

The controller has a human-machine interface or a user interface. Therefore, the detected network path may be further outputted to the user interface. This enables the user to visually know each level of network device through which the detection packet passes.

Step S215. The controller obtains a status of the network path according to the network path.

According to the detected network path, the status of the network path may be further obtained. The status of the network path includes a connected state, a disconnected state, and a looped state. The connected state means that the network path is connected and is a normal network path. The disconnected state means that the controller cannot receive messages reported by some hops of network devices. The looped state means that a hop count of a network path in the looped state is greater than a hop count of a normal network path. A network disconnection or loop fault can be discovered in a timely manner by learning the status of the network path. The status of the network path is directly obtained. Therefore, a direct conclusion on the status of the network path can be provided for the user, and the user does not need to check whether a path between all levels of network devices through which a detection packet passes is connected, disconnected, or looped.

In the path detection method in a VxLAN according to this embodiment of the present disclosure, the controller captures the packet according to the detection request inputted by the user to obtain the 5-tuple information of the packet, constructs, according to the 5-tuple information, a detection packet that has a same packet header as a packet used in a real service to simulate the real service to perform level-by-level forwarding. The IP address and the numbers of outbound and inbound interfaces through which the detection packet passes are reported to the controller level by level. Therefore, a real service path between the source VM and the destination VM may be detected in order to confirm the status of the network path. The detected network path is outputted in a user interface of the controller. This enables the user to visually know each level of network device through which the detection packet passes. The status of the network path is directly obtained. Therefore, a direct conclusion on the status of the network path can be provided for the user, and the user does not need to check whether a path between all levels of network devices through which a detection packet passes is connected, disconnected, or looped.

Figure 5:
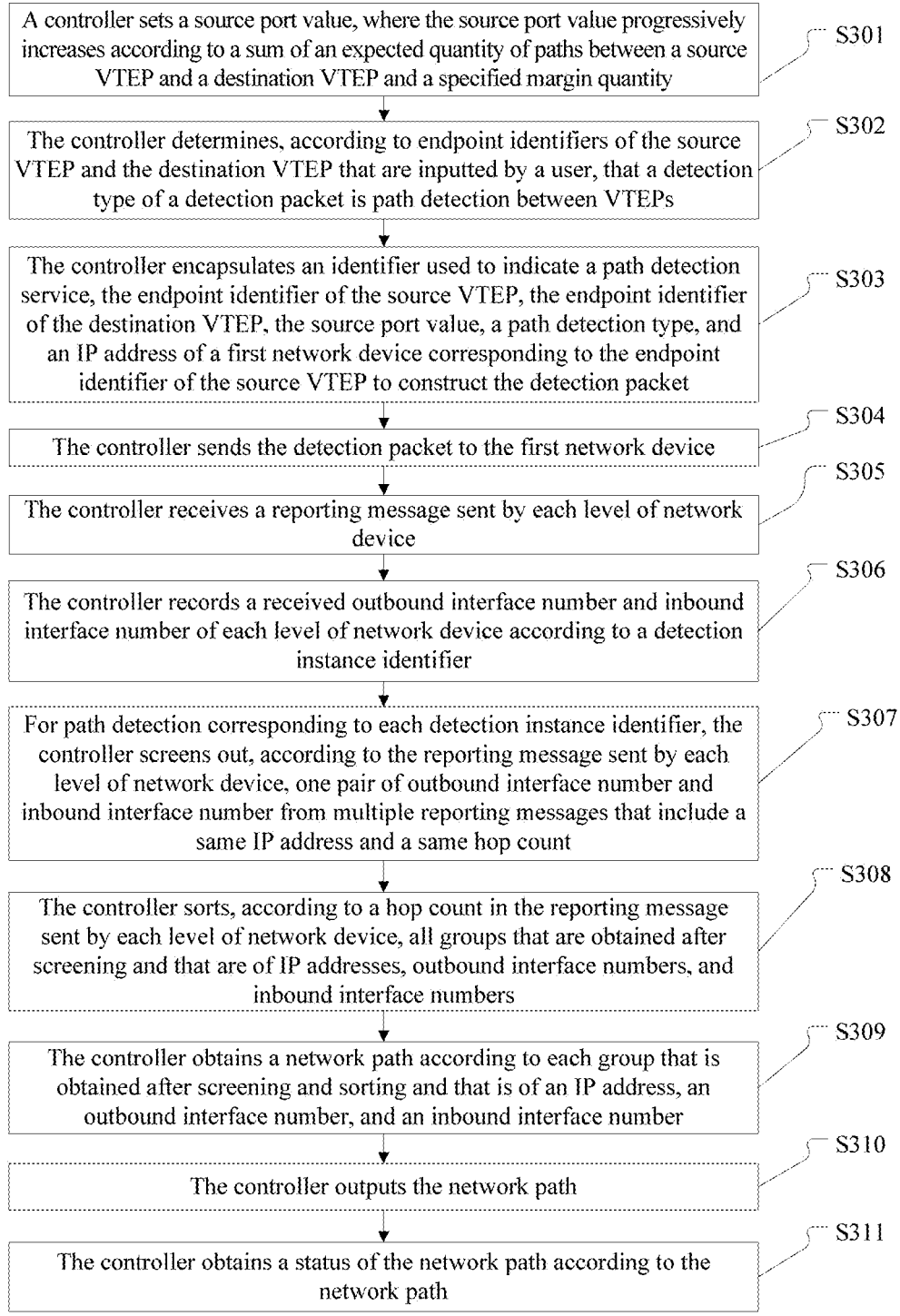
FIG. 5 is a schematic flowchart of an inter-VTEP path detection method according to an embodiment of the present disclosure.

FIG. 5 is a schematic flowchart of an inter-VTEP path detection method according to an embodiment of the present disclosure. The method includes the following steps.

Step S301. A controller sets a source port value, where the source port value progressively increases according to a sum of an expected quantity of paths between a source VTEP and a destination VTEP and a specified margin quantity.

This embodiment relates to path detection between VTEPs, that is, multipath radar detection. All possible paths existing between two VTEPs need to be detected. Multipathing is to detect whether a quantity of paths between two VTEPs satisfies an expectation, and is a type of tentative detection. A user may directly input an endpoint identifier of a source VTEP to be detected and an endpoint identifier of a destination VTEP to be detected.

A difference between this embodiment and path detection between VMs lies in For detection between VTEPs, the user does not transfer 5-tuple data, and therefore, the controller needs to set a source port value, where the source port value progressively increases each time a detection packet is sent. Therefore, the set source port value is also referred to as an initial source port value, and a value range of the initial source port value is 4096 to 65535. A progressively increased source port value is used as a source port value of each detection packet till a detection packet including a maximum source port value is constructed. In multipath detection, a quantity of detection packets is inputted according to a path quantity known to the user, and the detection can be covered only when the quantity of detection packets is greater than the known path quantity. Therefore, a count of progressively increasing the source port value is determined according to the expected quantity of paths between the source VTEP and the destination VTEP and the specified margin quantity. For example, if the expected quantity of paths is 200, the progressively increasing count may be set to 220. Multipath detection itself is a type of tentative detection, and multiple times of detection may be performed. For example, it is expected that there are 100 paths. 110 packets are specified for the first time for detection, and 120 packets are specified for the second time for detection. An obtained maximum path value is an existing maximum path quantity. The specified margin quantity is a quantity that is set when path detection is performed and that is greater than the expected quantity of paths. The specified margin quantity is a positive integer.

Step S302. The controller determines, according to endpoint identifiers of the source VTEP and the destination VTEP that are inputted by a user, that a detection type of the detection packet is path detection between VTEPs.

The controller constructs the detection packet according to the source and destination VTEPs inputted by the user. The detection type of the detection packet is path detection between VTEPs. Other content is the same as that of a detection packet of path detection between VMs, and details are not described herein again.

Step S303. The controller encapsulates an identifier used to indicate a path detection service, the endpoint identifier of the source VTEP, the endpoint identifier of the destination VTEP, the source port value, a path detection type, and an IP address of a first network device corresponding to the endpoint identifier of the source VTEP to construct the detection packet.

After obtaining the foregoing information, the controller may construct the detection packet, that is, encapsulate the foregoing information for transmission on an OPENFLOW network. In this embodiment, a VxLAN format is used to encapsulate the detection packet. An encapsulation format of the detection packet is shown in FIG. 4.

Step S304. The controller sends the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP.

Step S305. The controller receives a reporting message sent by each level of network device, where the reporting message includes the first reporting message and a second reporting message that is sent by the second network device.

For path detection between VTEPs, multiple source port values are included. When a reporting message reported by a network device corresponding to the endpoint identifier of the destination VTEP is detected by the controller and the reporting message includes a network path with a maximum source port value, the detection is completed.

Step S306. The controller records a received outbound interface number and inbound interface number of each level of network device according to a detection instance identifier.

Step S307. For path detection corresponding to each detection instance identifier, the controller screens out, according to the reporting message sent by each level of network device, one pair of outbound interface number and inbound interface number from multiple reporting messages that include a same IP address and a same hop count.

Hop counts in the reporting messages sent by all levels of network devices progressively and sequentially decrease from the first network device corresponding to the endpoint identifier of the source VTEP to the second network device corresponding to the endpoint identifier of the destination VTEP.

Step S308. The controller sorts, according to a hop count in the reporting message sent by each level of network device, all groups that are obtained after screening and that are of IP addresses, outbound interface numbers, and inbound interface numbers.

The hop count progressively decreases each time the detection packet is forwarded to a next level of network device.

Step S309. The controller obtains the network path according to each group that is obtained after screening and sorting and that is of an IP address, an outbound interface number, and an inbound interface number.

Step S310. The controller outputs the network path.

Step S311. The controller obtains a status of the network path according to the network path.

Recording, screening, and sorting outbound interface numbers and inbound interface numbers of network devices, obtaining a network path, outputting the network path, and obtaining a status of the network path are the same as those in the foregoing embodiment. Details are not described herein again.

According to the network path detection method provided in this embodiment of the present disclosure, the controller constructs the detection packet according to the endpoint identifiers of the source VTEP and the destination VTEP that are inputted by the user. The network device forwards the detection packet level by level, and reports, to the controller level by level, the IP address and the numbers of outbound and inbound interfaces through which the detection packet passes. Therefore, multiple real service paths between the source VTEP and the destination VTEP can be detected. The detected network path is outputted in a user interface of the controller. This enables the user to visually know each level of network device through which the detection packet passes. The status of the network path is directly obtained. Therefore, a direct conclusion on the status of the network path can be provided for the user, and the user does not need to check whether a path between all levels of network devices through which a detection packet passes is connected, disconnected, or looped.

Figure 6:
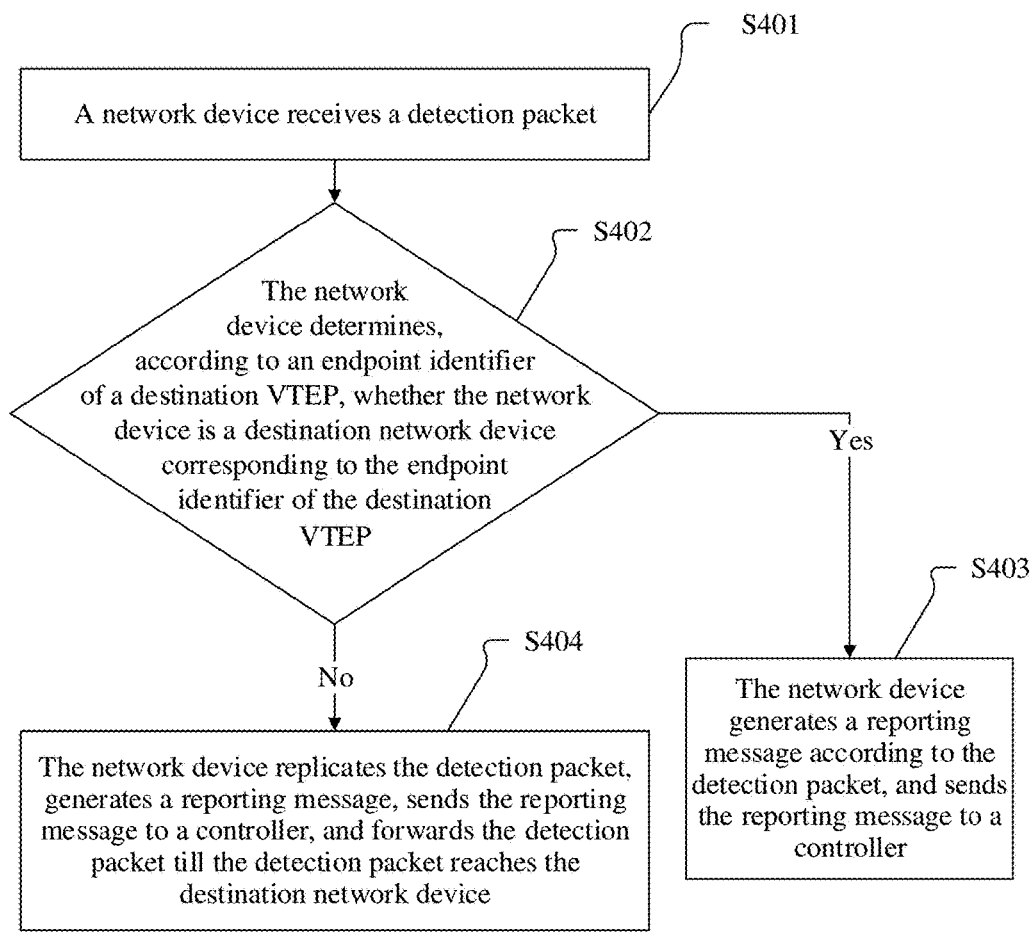
FIG. 6 is a schematic flowchart of another path detection method in a VxLAN according to an embodiment of the present disclosure.

FIG. 6 is a schematic flowchart of another path detection method in a VxLAN according to an embodiment of the present disclosure. The method includes the following steps.

Step S401. A network device receives a detection packet.

Any level of network device receives the detection packet. The any level of network device may be a network device corresponding to an endpoint identifier of a source VTEP, may be an intermediate network device, or may be a network device corresponding to an endpoint identifier of a destination VTEP. If the any level of network device is the network device corresponding to the endpoint identifier of the source VTEP, the detection packet is received from a controller. If the any level of network device is any other level of network device, the detection packet is received from an upper level of network device. The network device herein is a layer-2 device or layer-3 device that supports a VxLAN, and may be a switch or a router.

The detection packet is constructed by the controller according to a detection request by simulating an actual packet. The detection packet includes an identifier used to indicate a path detection service, the endpoint identifier of the source VTEP, the endpoint identifier of the destination VTEP, a source port value, a path detection type, and an IP address of the network device corresponding to the endpoint identifier of the source VTEP. The path detection type includes path detection between VMs and path detection between VTEPs. The path detection between VMs is also referred to as single-path detection, and the path detection between VTEPs is also referred to as multipath radar detection.

In this embodiment, a VxLAN format is used to encapsulate the detection packet. A format of the detection packet is shown in FIG. 4. For details, refer to the description in step S206.

A packet is delivered and received based on an OPENFLOW network, further, using an OPENFLOW packet-out interface and an OPENFLOW packet-in interface.

Optionally, the method may further include identifying the received detection packet according to the identifier used to indicate the path detection service, and obtaining, according to a stored correspondence between the detection packet and an execution action in an ACL or a flow table that is preset or that is sent by the controller, an execution action corresponding to the detection packet, where the execution action includes replicating and/or forwarding the detection packet, and sending the reporting message to the controller.

Once the network device identifies that the detection packet is received, the network device can learn, according to the stored correspondence between the detection packet and an execution action in the ACL or the flow table, the execution action to be performed after the detection packet is received, and then directly perform the execution action. This simplifies a processing procedure.

Step S402. The network device determines, according to an endpoint identifier of a destination VTEP, whether the network device is a destination network device corresponding to the endpoint identifier of the destination VTEP, and if a determining result is that the network device is the destination network device corresponding to the endpoint identifier of the destination VTEP, performs step S403, otherwise, performs step S404.

Step S403. If the network device is the destination network device corresponding to the endpoint identifier of the destination VTEP, the network device generates a reporting message according to the detection packet, and sends the reporting message to the controller.

The network device in this embodiment may be any level of network device. An operation step performed by the network device corresponding to the endpoint identifier of the destination VTEP is different from an operation step performed by any other level of network device. The network device corresponding to the endpoint identifier of the destination VTEP only needs to send the reporting message to the controller without replicating and forwarding the detection packet. Therefore, whether the network device is the network device corresponding to the endpoint identifier of the destination VTEP needs to be determined herein.

Step S404. If the network device is not the destination network device corresponding to the endpoint identifier of the destination VTEP, the network device replicates the detection packet, generates a reporting message, sends the reporting message to the controller, and forwards the detection packet till the detection packet reaches the destination network device.

Packet forwarding between network devices is automatically performed according to a source port value obtained by means of calculation. However, the network device in this embodiment of the present disclosure further needs to replicate the detection packet when performing packet forwarding. This is because the network device in this embodiment of the present disclosure not only needs to forward the detection packet, but also needs to encapsulate the detection packet in a reporting message and send the reporting message to the controller.

In the other approaches, which path is used for packet forwarding between network devices is unknown. This problem needs to be resolved in this embodiment of the present disclosure. That is, the detection packet passes through each level of network device, and each level of network device sends a reporting message to the controller using a packet-in interface. The reporting message includes the replicated detection packet, an IP address of a network device sending the reporting message, an inbound interface number of a network device receiving the detection packet, and an outbound interface number of a network device forwarding the detection packet and/or sending the reporting message.

It should be noted that one network device has multiple interface numbers. Which interfaces of which network device the detection packet is received and sent from need to be determined herein.

After receiving an outbound interface number and inbound interface number of each level of network device, the controller may obtain, according to the interface numbers, a detected network path, that is, learn which network devices the simulated detection packet passes through in sequence.

In the path detection method in a VxLAN according to this embodiment of the present disclosure, the network device forwards, level by level, the detection packet that is constructed by the controller according to the detection request, and reports, to the controller level by level, the IP address and the numbers of outbound and inbound interfaces through which the detection packet passes. Therefore, the controller can find a real service path by means of detection.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

Figure 7:
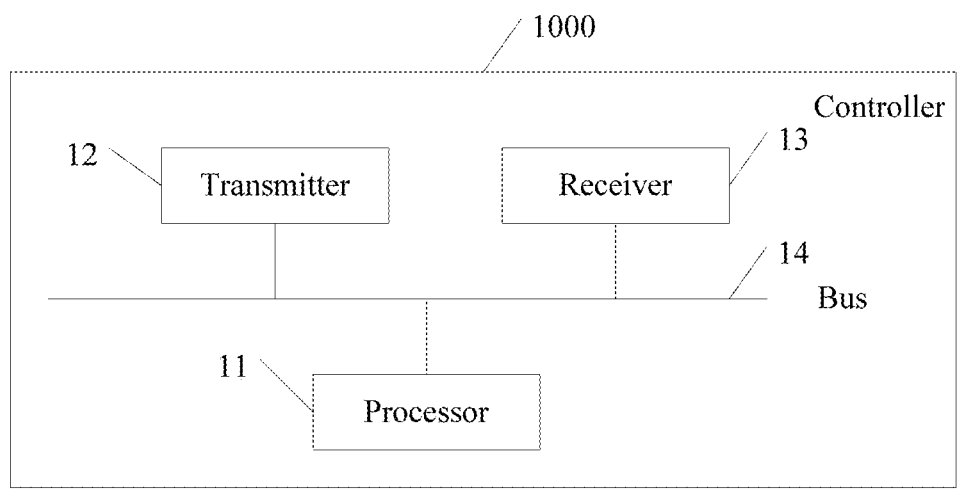
FIG. 7 is a schematic structural diagram of a controller according to an embodiment of the present disclosure.

Referring to FIG. 7, an embodiment of the present disclosure provides a controller 1000 that is configured to implement the foregoing path detection function in a VxLAN. As shown in FIG. 7, the controller 1000 includes a processor 11, a transmitter 12, and a receiver 13. The processor 11, the transmitter 12, and the receiver 13 are connected to each other using a bus 14.

The processor 11 is configured to construct a detection packet according to a detection request inputted by a user, where the detection packet includes an identifier used to indicate a path detection service, an endpoint identifier of a source VTEP, an endpoint identifier of a destination VTEP, a source port value, a path detection type, and an IP address of a first network device corresponding to the endpoint identifier of the source VTEP.

The transmitter 12 is configured to send the detection packet to the first network device such that the first network device replicates the detection packet, generates a first reporting message, sends the first reporting message to the controller, and forwards the detection packet according to the source port value till the detection packet reaches a second network device corresponding to the endpoint identifier of the destination VTEP, where the first reporting message includes the detection packet, the IP address of the first network device, and outbound and inbound interface numbers of the first network device.

The receiver 13 is configured to receive a reporting message sent by each level of network device, where the reporting message includes the first reporting message and a second reporting message that is sent by the second network device.

The processor 11 is further configured to obtain a network path from the first network device to the second network device according to an IP address, an outbound interface number, and an inbound interface number in the reporting message sent by each level of network device.

It should be noted that the transmitter 12 and the receiver 13 may be separate devices or components, or may be an integrated transceiver.

The processor 11 may be a general processor, including a central processing unit (CPU), a network processor (NP), or the like, or may be a digital signal processor (DSP), an application-specific integrated circuit (ASIC), a field-programmable gate array (FPGA), another programmable logic device, or the like.

When the processor 11 is a CPU, the controller 1000 may further include a memory configured to store a program. Further, the program may include program code, and the program code includes a computer operation instruction. The memory may include a random access memory (RAM), or may further include a non-volatile memory, for example, at least one disk memory. The processor 11 executes the program code stored in the memory to implement the foregoing function.

Optionally, the detection request includes an IP address of a source VM, an IP address of a destination VM, and a protocol type identifier.

The processor 11 is further configured to capture a target packet according to the IP address of the source VM, the IP address of the destination VM, and the protocol type identifier in the detection request.

The processor 11 is further configured to obtain a port number of the source VM of the target packet and a port number of the destination VM of the target packet to obtain 5-tuple information, where the 5-tuple information includes the IP address of the source VM, the IP address of the destination VM, the protocol type identifier, the port number of the source VM, and the port number of the destination VM.

The processor 11 is further configured to determine the source port value according to the 5-tuple information.

The processor 11 is further configured to determine the source VTEP according to the IP address of the source VM, and determine the destination VTEP according to the IP address of the destination VM.

The processor 11 is further configured to obtain the IP address of the first network device corresponding to the endpoint identifier of the source VTEP.

The processor 11 is further configured to determine, according to the detection request, that the path detection type is path detection between VMs.

Optionally, the detection request includes the endpoint identifier of the source VTEP and the endpoint identifier of the destination VTEP.

The processor 11 is further configured to set the source port value, where the source port value progressively increases according to a sum of an expected quantity of paths between the source VTEP and the destination VTEP and a specified margin quantity, the expected quantity of paths is a path quantity known to the user, the specified margin quantity is a quantity that is specified when path detection is performed and that is greater than the expected quantity of paths, and the specified margin quantity is a positive integer.

The processor 11 is further configured to determine, according to the detection request, that the path detection type is path detection between VTEPs.

Optionally, the reporting message further includes a hop count.

The processor 11 is further configured to screen out, according to the reporting message sent by each level of network device, one pair of outbound interface number and inbound interface number from multiple reporting messages that include a same IP address and a same hop count, where hop counts in the reporting messages sent by all levels of network devices progressively and sequentially decrease from the first network device corresponding to the endpoint identifier of the source VTEP to the second network device corresponding to the endpoint identifier of the destination VTEP.

The processor 11 is further configured to sort, according to the hop count in the reporting message sent by each level of network device, all groups that are obtained after screening and that are of IP addresses, outbound interface numbers, and inbound interface numbers.

The processor 11 is further configured to obtain the network path according to each group that is obtained after screening and sorting and that is of an IP address, an outbound interface number, and an inbound interface number.

Optionally, the detection packet further includes a detection instance identifier, and the detection instance identifier is used to identify different path detection.

The processor 11 is further configured to record a received IP address, outbound interface number, and inbound interface number of each network path according to the detection instance identifier.

Optionally, the processor 11 is further configured to obtain, according to the detected network path, a status of the network path, where the status of the network path includes a connected state, a disconnected state, and a looped state.

The controller 1000 provided in this embodiment of the present disclosure constructs the detection packet according to the detection request. The network device forwards the detection packet level by level, and reports, to the controller 1000 level by level, the IP address and the numbers of outbound and inbound interfaces through which the detection packet passes. Therefore, a real service path can be detected.

Figure 8:
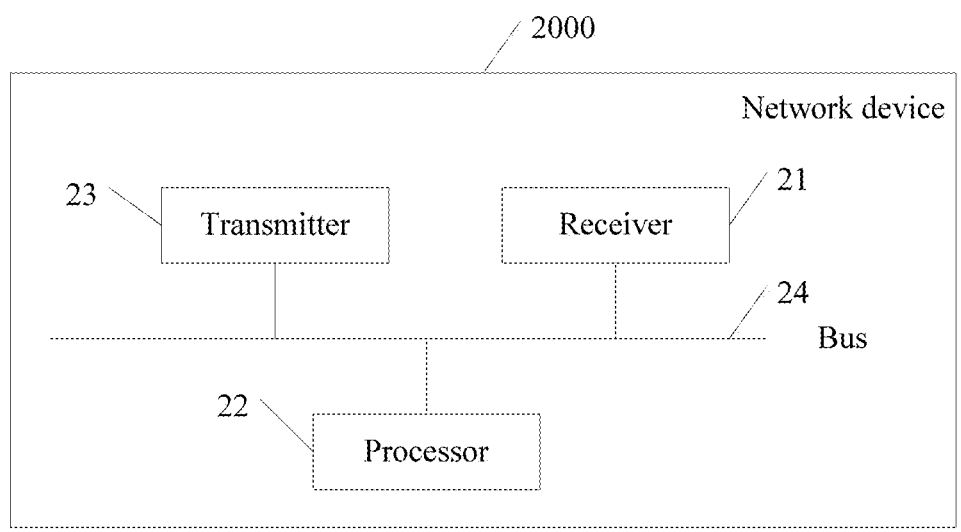
FIG. 8 is a schematic structural diagram of a network device according to an embodiment of the present disclosure.

Referring to FIG. 8, an embodiment of the present disclosure provides a network device 2000 that is configured to implement the foregoing path detection function in a VxLAN. As shown in FIG. 8, the network device 2000 includes a receiver 21, a processor 22, and a transmitter 23. The receiver 21, the processor 22, and the transmitter 23 are connected to each other using a bus 24.

The receiver 21 is configured to receive a detection packet, where the detection packet is constructed by a controller according to a detection request inputted by a user, and the detection packet includes an identifier used to indicate a path detection service, an endpoint identifier of a source VTEP, an endpoint identifier of a destination VTEP, a source port value, a path detection type, and an IP address of a source network device corresponding to the endpoint identifier of the source VTEP.

The processor 22 is configured to determine, according to the endpoint identifier of the destination VTEP, whether the network device 2000 is a destination network device corresponding to the endpoint identifier of the destination VTEP.

The processor 22 is further configured to generate a reporting message according to the detection packet, and send the reporting message to the controller if the network device 2000 is the destination network device corresponding to the endpoint identifier of the destination VTEP, or replicate the detection packet and generate a reporting message if the network device 2000 is not the destination network device corresponding to the endpoint identifier of the destination VTEP.

The transmitter 23 is configured to send the reporting message to the controller, and forward the detection packet till the detection packet reaches the destination network device.

The reporting message includes the detection packet, an IP address of the network device, and numbers of an outbound interface and an inbound interface that are of the network device and through which the detection packet passes.

The processor 22 may be a general processor, including a CPU, an NP, or the like, or may be a DSP, an ASIC, an FPGA, another programmable logic device, or the like.

When the processor 22 is a CPU, the network device 2000 may further include a memory configured to store a program. Further, the program may include program code, and the program code includes a computer operation instruction. The memory may include a RAM, or may further include a non-volatile memory, for example, at least one disk memory. The processor 22 executes the program code stored in the memory to implement the foregoing function.

Optionally, the processor 22 is further configured to identify the received detection packet according to the identifier used to indicate the path detection service.

The processor 22 is further configured to obtain, according to a stored correspondence between the detection packet and an execution action in an ACL or a flow table that is preset or that is sent by the controller, an execution action corresponding to the detection packet, where the execution action includes replicating and/or forwarding the detection packet, and sending the reporting message to the controller.

The network device 2000 provided in this embodiment of the present disclosure forwards, level by level, the detection packet that is constructed by the controller according to the detection request, and reports, to the controller level by level, the IP address and the numbers of outbound and inbound interfaces through which the detection packet passes. Therefore, the controller can find a real service path by means of detection.

Figure 9:
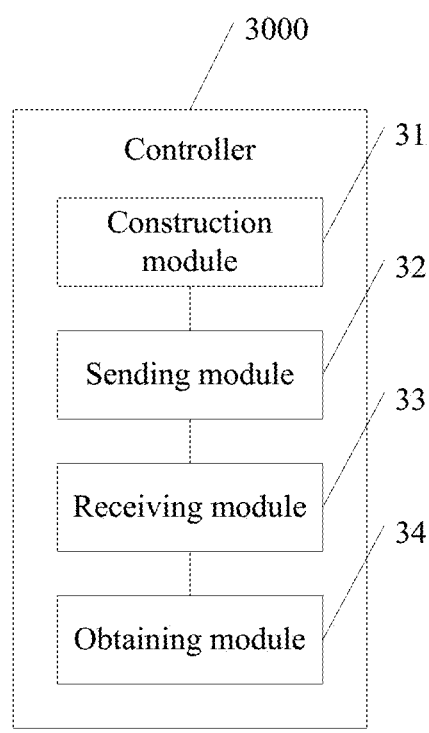
FIG. 9 is a schematic structural diagram of another controller according to an embodiment of the present disclosure.

FIG. 9 is a schematic structural diagram of a controller 3000 according to an embodiment of the present disclosure. The controller 3000 includes a construction module 31, a sending module 32, a receiving module 33, and an obtaining module 34 that are connected in sequence.

The construction module 31 is configured to construct a detection packet according to a detection request inputted by a user.

The controller 3000 is independent of a VM, a VTEP, and a network device. For example, in path detection shown in FIG. 2, the controller 3000 may be an AC. The controller 3000 may be a cluster, and data may be sent and received by any controller in the cluster. The controller 3000 has a human-machine interface (not shown), and can obtain the detection request inputted by the user. The detection request may be initiated using a packet that is specified and captured by the user in the human-machine interface and that needs to be used for network path detection, or may be initiated by inputting a source VTEP and a destination VTEP. One VTEP may be mounted to one or more VMs. Therefore, path detection in this application may be detection between two VMs, that is, single-path detection, or may be detection between two VTEPs, that is, multipath radar detection, that is, all possible paths between all VMs connected to the two VTEPs are detected.

When performing network path detection, the controller 3000 needs to construct the detection packet, and sends the detection packet to the network device to detect whether a path through which the detection packet passes is the same as that through which an actual packet passes. The detection packet includes an identifier used to indicate a path detection service, an endpoint identifier of the source VTEP, an endpoint identifier of the destination VTEP, a source port value, a path detection type, and an IP address of a first network device corresponding to the source VTEP. Herein, the path detection type includes path detection between VMs and path detection between VTEPs.

The sending module 32 is configured to send the detection packet to the first network device such that the first network device replicates the detection packet, generates a first reporting message, sends the first reporting message to the controller 3000, and forwards the detection packet according to the source port value till the detection packet reaches a second network device corresponding to the endpoint identifier of the destination VTEP.

The first reporting message includes the detection packet, the IP address of the first network device, and outbound and inbound interface numbers of the first network device.

In this embodiment of the present disclosure, a packet is delivered and received based on an OPENFLOW network, further, using an OPENFLOW packet-out interface and an OPENFLOW packet-in interface. The controller 3000 sends, using the packet-out interface, the constructed detection packet to the first network device corresponding to the source VTEP. Packet forwarding between network devices is automatically performed according to a source port value obtained by means of calculation. The network device herein is a layer-2 device or layer-3 device that supports a VxLAN, and may be a switch or a router.

The network device in this embodiment of the present disclosure further needs to replicate the detection packet when performing packet forwarding. This is because the network device in this embodiment of the present disclosure not only needs to forward the detection packet, but also needs to encapsulate the detection packet in a reporting message and send the reporting message to the controller 3000. The first network device replicates the detection packet, generates the first reporting message, sends the first reporting message to the controller 3000, and forwards the detection packet according to the source port value till the detection packet reaches a next level of network device of the first network device. Each level of network device repeatedly performs the step of replicating the detection packet, reporting the first reporting message, and forwarding the detection packet, till the second network device corresponding to the endpoint identifier of the destination VTEP receives the detection packet. The second network device only sends a second reporting message to the controller 3000 without replicating and forwarding the detection packet.

It should be noted that message content included in both the "first reporting message" and the "second reporting message" herein is the detection packet, an IP address of a network device sending the reporting message, a number of an inbound interface through which the detection packet passes when the detection packet is received, and a number of an outbound interface through which the detection packet passes when the detection packet is forwarded, where the inbound interface and the outbound interface are of the network device. The "first reporting message" and the "second reporting message" are defined to only differentiate whether the reporting message is sent by a network device corresponding to the endpoint identifier of the destination VTEP.

The receiving module 33 is configured to receive a reporting message sent by each level of network device, where the reporting message includes the first reporting message and the second reporting message that is sent by the second network device.

Packet forwarding between network devices is automatically performed according to a source port value obtained by means of calculation. Therefore, in the other approaches, which path is used for packet forwarding between network devices is unknown. This problem needs to be resolved in this embodiment of the present disclosure. That is, the detection packet passes through each level of network device, and each level of network device sends a reporting message to the controller 3000 using a packet-in interface.

The controller 3000 may receive the first reporting message sent by each level of network device and the second reporting message that is sent by the second network device corresponding to the endpoint identifier of the destination VTEP. Therefore, the reporting message includes the first reporting message and the second reporting message that is sent by the second network device. It should be noted that one network device has multiple interface numbers. Which interfaces of which network device the detection packet is received and sent from need to be determined herein.

The obtaining module 34 is configured to obtain a network path from the first network device to the second network device according to an IP address, an outbound interface number, and an inbound interface number in the reporting message sent by each level of network device.

After receiving the IP address, outbound interface number, and inbound interface number of each level of network device, the controller may obtain, according to the interface numbers, the detected network path, that is, learn which network devices the constructed detection packet passes through in sequence.

As shown in FIG. 2, an AC controller cluster sends, using an OPENFLOW architecture, a detection packet to a node X corresponding to a source VTEP. The node X replicates the detection packet, generates a reporting message, forwards the detection packet to a node A, and sends the reporting message to the AC controller cluster. Then, nodes A, C, and Y repeatedly perform the step of replicating the detection packet, forwarding the detection packet, and sending the reporting message. In this way, after forwarding the detection packet is completed, the AC controller cluster may learn, according to the received reporting messages, a path through which the detection packet passes, for example, X-A-C-Y. The nodes herein are network devices.

The controller 3000 provided in this embodiment of the present disclosure constructs the detection packet according to the detection request. The network device forwards the detection packet level by level, and reports to the controller 3000 level by level, the IP address and the numbers of outbound and inbound interfaces through which the detection packet passes. Therefore, a real service path can be detected.

Figure 10:
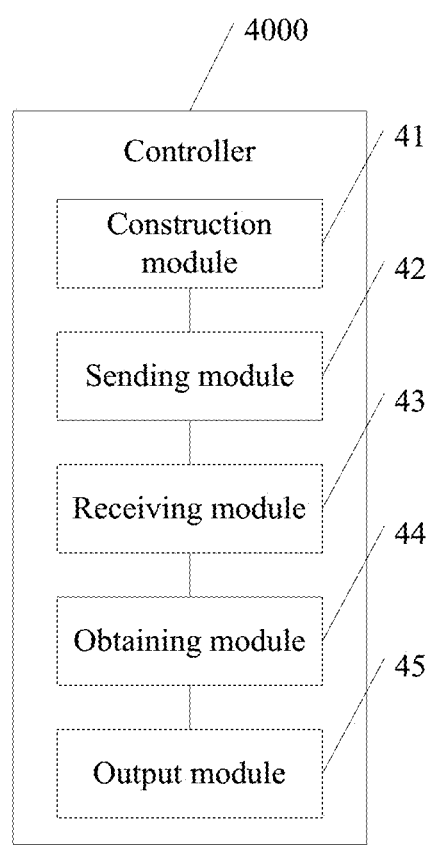
FIG. 10 is a schematic structural diagram of still another controller according to an embodiment of the present disclosure.

FIG. 10 is a schematic structural diagram of still another controller 4000 according to an embodiment of the present disclosure. The controller 4000 includes a construction module 41, a sending module 42, a receiving module 43, an obtaining module 44, and an output module 45 that are connected in sequence.

The construction module 41 is configured to capture a target packet according to an IP address of a source VM, an IP address of a destination VM, and a protocol type identifier in a detection request inputted by a user.

This embodiment relates to network path detection between VMs. The user may instruct, by inputting an IP address of a source VM of a to-be-detected packet, an IP address of a destination VM of the to-be-detected packet, and a protocol type identifier, the controller 4000 to capture the target packet. The source VM and the destination VM of the packet are VMs mounted to a source VTEP and a destination VTEP respectively.

The construction module 41 is further configured to obtain a port number of the source VM of the target packet and a port number of the destination VM of the target packet, to obtain 5-tuple information of the target packet.

After capturing the packet, the controller 4000 may obtain the port number of the source VM of the packet and the port number of the destination VM of the packet to obtain the 5-tuple information of the target packet. The 5-tuple information includes the IP address of the source VM, the IP address of the destination VM, the protocol type identifier, the port number of the source VM, and the port number of the destination VM. After obtaining the 5-tuple information of the packet, the controller 4000 triggers detection of the packet.

The construction module 41 is further configured to determine a source port value according to the 5-tuple information.

The controller 4000 may calculate, according to 5-tuple data, a source port value using hash, fill the value into a detection packet, and then forward the detection packet for path detection. Subsequently, on each hop of network device that the detection packet reaches, a path is selected according to the source port value. A network path has a unique source port value. For single-path detection, only one source port value can be calculated according to one piece of 5-tuple data.

The construction module 41 is further configured to determine an endpoint identifier of the source VTEP according to the IP address of the source VM, and determine an endpoint identifier of the destination VTEP according to the IP address of the destination VM.

Because each VM is mounted to a VTEP by the user using the controller 4000, the controller 4000 stores a correspondence between a VTEP and a VM mounted to the VTEP. Therefore, the controller 4000 can determine, according to the IP address of the source VM and the IP address of the destination VM, the endpoint identifier of the source VTEP corresponding to the source VM and the endpoint identifier of the destination VTEP corresponding to the destination VM, respectively. The source and destination VTEPs are used to determine the first and last network devices of a detection packet.

The construction module 41 is further configured to obtain an IP address of a first network device corresponding to the endpoint identifier of the source VTEP.

The controller 4000 also pre-stores a correspondence between a VTEP and a connected network device. Therefore, the IP address of the first network device can also be obtained according to the endpoint identifier of the source VTEP.

The construction module 41 is further configured to determine, according to the detection request, that the path detection type is path detection between VMs.

The detection request includes the 5-tuple information of the packet captured by the user. Therefore, it can be determined that the path detection is to perform simulation detection on the packet, that is, detection on a single packet or a single path, which is also referred to as path detection between VMs.

The construction module 41 is further configured to encapsulate an identifier used to indicate a path detection service, the endpoint identifier of the source VTEP, the endpoint identifier of the destination VTEP, the source port value, the path detection type, and the IP address of the first network device corresponding to the endpoint identifier of the source VTEP to construct the detection packet.

After obtaining the foregoing information, the controller 4000 may construct the detection packet, that is, encapsulate the foregoing information for transmission on an OPEN-FLOW network. The path detection between VMs is used for diagnosis of a path of a specified service flow.

In this embodiment, a VxLAN format is used to encapsulate the detection packet. As shown in FIG. 4, a format of the detection packet includes fields, that is, an outer MAC header, an IP header, a UDP header, and a VxLAN header. Other fields are packet content. A bit of a reserved field in the VxLAN header, for example, the last bit of the reserved field, is used as the identifier used to indicate the path detection service. The packet content (a layer-2 frame) includes a pseudo-header and an OAM header (OAM PDU). The pseudo-header is used to ensure that traffic is processed according to a forwarding pipeline selection result. The OAM header follows the pseudo-header and includes a OAM flag, an OAM type, a reserved field, and an extendable TLV. The OAM flag is used to identify the OAM header, and is of 32 bits. A value of the OAM flag is 0xFFFFFFFF. The OAM type is used to identify the path detection type, and is of one byte. In this embodiment of the present disclosure, 0x1 indicates full-path detection between VTEPs, 0x2 indicates single-path detection between VMs, and other values are reserved. The extendable TLV is used to carry the IP address, an inbound interface number, an outbound interface number, and the like that are of the first network device. Certainly, the extendable TLV may further include another field, for example, a detection instance identifier. The detection instance identifier is used to identify different network path detection.

The sending module 42 is configured to send the detection packet to the first network device such that the first network device replicates the detection packet, generates a first reporting message, sends the first reporting message to the controller 4000, and forwards the detection packet according to the source port value till the detection packet reaches a second network device corresponding to the endpoint identifier of the destination VTEP.

Packet forwarding between network devices is automatically performed according to a source port value obtained by means of calculation. Therefore, in the other approaches, which path is used for packet forwarding between network devices is unknown. This problem needs to be resolved in this embodiment of the present disclosure. That is, the detection packet passes through each level of network device, and each level of network device sends a reporting message to the controller 4000 using a packet-in interface.

The controller 4000 determines, according to whether a reporting message sent by the second network device corresponding to the endpoint identifier of the destination VTEP is received and whether a specified quantity of network paths is detected, whether the path detection is completed. The specified quantity of the network paths is determined by the source port value.

The receiving module 43 is configured to receive a reporting message sent by each level of network device, where the reporting message includes the first reporting message and a second reporting message that is sent by the second network device.

The controller 4000 may receive the first reporting message sent by each level of network device and the second reporting message that is sent by the second network device corresponding to the endpoint identifier of the destination VTEP. Therefore, the reporting message includes the first reporting message and the second reporting message that is sent by the second network device. The reporting message includes the replicated detection packet, an IP address of a network device sending the reporting message, an inbound interface number of a network device receiving the detection packet, and an outbound interface number of a network device forwarding the detection packet and/or sending the reporting message. It should be noted that one network device has multiple interface numbers. Which interfaces of which network device the detection packet is received and sent from need to be determined herein.

For the single-path detection in this embodiment, only one source port value is calculated. Therefore, when the controller receives the reporting message sent by the second network device corresponding to the endpoint identifier of the destination VTEP, it may be determined that the path detection is completed.

Alternatively, whether the path detection is completed may be determined by setting a path detection time. If the set time arrives, it may be considered that the path detection is completed. Alternatively, whether the path detection is completed may be determined according to whether the reporting message sent by the second network device corresponding to the destination VTEP is received and a hop count of the path detection. If the reporting message sent by the second network device corresponding to the destination VTEP is received and hops corresponding to network devices sequentially decrease level by level, it may be considered that the path detection is completed, otherwise, it may be considered that the path detection is not ended or fails even if a reporting message sent by a network device corresponding to the destination VTEP is received but hops corresponding to network devices do not sequentially decrease level by level, or all required hops are not included.

The obtaining module 44 is configured to record a received IP address, outbound interface number, and inbound interface number of each network path according to the detection instance identifier.

The controller 4000 may detect multiple network paths at the same time. Therefore, multiple detection instances are available. For detection of each network path, a detection instance identifier needs to be set. The detection instance identifier is included in the extendable TLV field. The detection instance identifier is used to identify different network path detection of a packet. The controller 4000 records a received outbound interface number and inbound interface number of each level of network device according to the detection instance identifier included in the received detection packet.

The obtaining module 44 is further configured to for path detection corresponding to each detection instance identifier, screen out, according to the reporting message sent by each level of network device, one pair of outbound interface number and inbound interface number from multiple reporting messages that include a same IP address and a same hop count.

A network device may repeatedly report a message. Therefore, received outbound interfaces and inbound interfaces of a same network device corresponding to a same hop count need to be screened, and only one pair of outbound interface number and inbound interface number of a network device corresponding to the IP address is reserved. Hop counts in the reporting messages sent by all levels of network devices progressively and sequentially decrease from the first network device corresponding to the endpoint identifier of the source VTEP to the second network device corresponding to the endpoint identifier of the destination VTEP.

The obtaining module 44 is further configured to sort, according to the hop count in the reporting message sent by each level of network device, all groups that are obtained after screening and that are of IP addresses, outbound interface numbers, and inbound interface numbers.

The reporting message may further include the hop count, for example, a TTL. The hop count decreases by 1 each time a packet passes through a network device during packet forwarding. Therefore, received outbound interface and inbound interface numbers that are obtained after screening and that are of all levels of network devices may be sorted according to the hop counts.

The obtaining module 44 is further configured to obtain the network path according to each group that is obtained after screening and sorting and that is of an IP address, an outbound interface number, and an inbound interface number.

After screening and sorting, the obtained network path is a network path having a clear and unique topological relationship.

Reported outbound interface numbers and inbound interface numbers of a network device are screened according to an IP address of the network device and a hop count. This can avoid repeated outbound interface numbers and inbound interface numbers of the network device on a network path. Outbound interface numbers and inbound interface numbers of all levels of network devices are sorted according to hop counts. Therefore, a precedence relationship of all levels of network devices through which a detection packet passes can be obtained accurately, and a real network path can be restored.

The output module 45 is configured to output the network path.

A detector has a human-machine interface or a user interface. Therefore, the detected network path may be further outputted to the user interface. This enables the user to visually know each level of network device through which the detection packet passes.

The obtaining module 44 is further configured to obtain a status of the network path according to the network path.

According to the obtained detected network path, the status of the network path may be further obtained. The status of the network path includes a connected state, a disconnected state, and a looped state. The connected state means that the network path is connected and is a normal network path. The disconnected state means that the controller cannot receive messages reported by some hops of network devices. The looped state means that a hop count of a network path in the looped state is greater than a hop count of a normal network path. A network disconnection or loop fault can be discovered in a timely manner by learning the status of the network path. The status of the network path is directly obtained. Therefore, a direct conclusion on the status of the network path can be provided for the user, and the user does not need to check whether a path between all levels of network devices through which a detection packet passes is connected, disconnected, or looped.

The controller 4000 provided in this embodiment of the present disclosure captures the packet according to the detection request inputted by the user to obtain the 5-tuple information of the packet, constructs, according to the 5-tuple information, a detection packet that has a same packet header as a packet used in a real service to simulate the real service to perform level-by-level forwarding. The IP address and the numbers of outbound and inbound interfaces through which the detection packet passes are reported to the controller level by level. Therefore, a real service path between the source VM and the destination VM may be detected in order to confirm the status of the network path. The detected network path is outputted in a user interface of the controller 4000. This enables the user to visually know each level of network device through which the detection packet passes. The status of the network path is directly obtained. Therefore, a direct conclusion on the status of the network path can be provided for the user, and the user does not need to check whether a path between all levels of network devices through which a detection packet passes is connected, disconnected, or looped.

Still referring to FIG. 10, there is another implementation of the controller 4000 shown in FIG. 10. The controller 4000 is configured to perform multipath detection. In this implementation, a difference from the single-path detection described in the foregoing implementation lies in that the construction module 41 is configured to set a source port value, where the source port value progressively increases according to a sum of an expected quantity of paths between the source VTEP and the destination VTEP and a specified margin quantity.

This embodiment relates to path detection between VTEPs, that is, multipath radar detection. All possible paths existing between two VTEPs need to be detected. Multipathing is to detect whether a quantity of paths between two VTEPs satisfies an expectation, and is a type of tentative detection. A user may directly input an endpoint identifier of a source VTEP to be detected and an endpoint identifier of a destination VTEP to be detected.

A difference between this embodiment and path detection between VMs lies in for detection between VTEPs, the user does not transfer 5-tuple data, and therefore, the controller 4000 needs to set a source port value, where the source port value progressively increases each time a detection packet is sent. Therefore, the set source port value is also referred to as an initial source port value, and a value range of the initial source port value is 4096 to 65535. A progressively increased source port value is used as a source port value of each detection packet till a detection packet including a maximum source port value is constructed. In multipath detection, a quantity of detection packets is inputted according to a path quantity known to the user, and the detection can be covered only when the quantity of detection packets is greater than the known path quantity. Therefore, a count of progressively increasing the source port value is determined according to the expected quantity of paths between the source VTEP and the destination VTEP and the specified margin quantity. For example, if the expected quantity of paths is 200, the progressively increasing count may be set to 220. Multipath detection itself is a type of tentative detection, and multiple times of detection may be performed. For example, it is expected that there are 100 paths.

110 packets are specified for the first time for detection, and 120 packets are specified for the second time for detection. An obtained maximum path value is an existing maximum path quantity. The specified margin quantity is a quantity that is set when path detection is performed and that is greater than the expected quantity of paths. The specified margin quantity is a positive integer.

The construction module 41 is further configured to determine, according to the endpoint identifiers of the source VTEP and the destination VTEP that are inputted by the user, that a detection type of the detection packet is path detection between VTEPs.

The controller 4000 constructs the detection packet according to the source and destination VTEPs inputted by the user. The detection type of the detection packet is path detection between VTEPs. Other content is the same as that of a detection packet of path detection between VMs, and details are not described herein again.

If the controller 4000 receives a reporting message sent by a network device corresponding to the destination VTEP and a specified quantity of network paths corresponding to the packet is detected, the path detection is completed. The specified quantity is determined by a quantity of source port values. For path detection between VTEPs, multiple source port values are included. When a reporting message reported by a network device corresponding to the endpoint identifier of the destination VTEP is detected by the controller 4000 and the reporting message includes a network path with a maximum source port value, the detection is completed.

The controller 4000 provided in this embodiment of the present disclosure constructs the detection packet according to the endpoint identifiers of the source VTEP and the destination VTEP that are inputted by the user. The network device forwards the detection packet level by level, and reports, to the controller 4000 level by level, the IP address and the numbers of outbound and inbound interfaces through which the detection packet passes. Therefore, multiple real service paths between the source VTEP and the destination VTEP can be detected. A detected network path is outputted in a user interface of the controller 4000. This enables the user to visually know each level of network device through which the detection packet passes. The status of the network path is directly obtained. Therefore, a direct conclusion on the status of the network path can be provided for the user, and the user does not need to check whether a path between all levels of network devices through which a detection packet passes is connected, disconnected, or looped.

Figure 11:
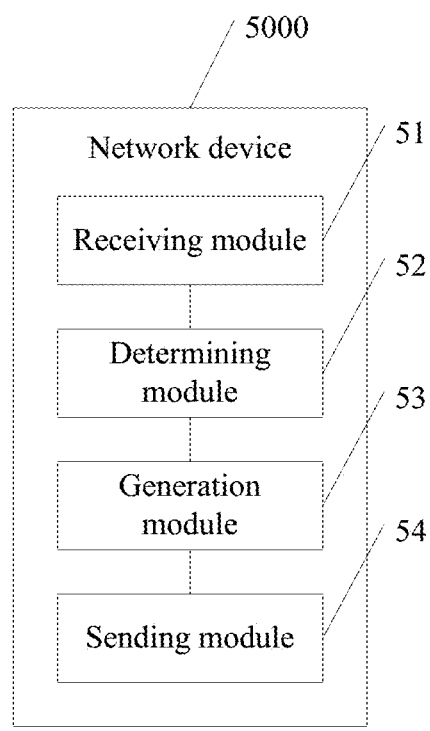
FIG. 11 is a schematic structural diagram of another network device according to an embodiment of the present disclosure.

FIG. 11 is a schematic structural diagram of another network device 5000 according to an embodiment of the present disclosure. The network device 5000 includes a receiving module 51, a determining module 52, a generation module 53, and a sending module 54 that are connected in sequence.

The receiving module 51 is configured to receive a detection packet.

Any level of network device receives the detection packet. The any level of network device may be a network device corresponding to an endpoint identifier of a source VTEP, may be an intermediate network device, or may be a network device corresponding to an endpoint identifier of a destination VTEP. If the any level of network device is the network device corresponding to the endpoint identifier of the source VTEP, the detection packet is received from a controller. If the any level of network device is any other level of network device, the detection packet is received from an upper level of network device. The network device herein is a layer-2 device or layer-3 device that supports a VxLAN, and may be a switch or a router.

The detection packet is constructed by the controller according to a detection request by simulating an actual packet. The detection packet includes an identifier used to indicate a path detection service, the endpoint identifier of the source VTEP, the endpoint identifier of the destination VTEP, a source port value, a path detection type, and an IP address of the network device corresponding to the endpoint identifier of the source VTEP. The path detection type includes path detection between VMs and path detection between VTEPs. The path detection between VMs is also referred to as single-path detection, and the path detection between VTEPs is also referred to as multipath radar detection.

In this embodiment, a VxLAN format is used to encapsulate the detection packet. A format of the detection packet is shown in FIG. 4. For details, refer to the description in step S206.

A packet is delivered and received based on an OPEN-FLOW network, further, using an OPENFLOW packet-out interface and an OPENFLOW packet-in interface.

In an implementation, the receiving module 51 is configured to identify the received detection packet according to the identifier used to indicate the path detection service, and obtain, according to a stored correspondence between the detection packet and an execution action in an ACL or a flow table that is preset or that is sent by the controller, an execution action corresponding to the detection packet, where the execution action includes replicating and/or forwarding the detection packet, and sending the reporting message to the controller.

Once the network device 5000 identifies that the detection packet is received, the network device 5000 can learn, according to the stored correspondence between the detection packet and an execution action in the ACL or the flow table, the execution action to be performed after the detection packet is received, and then directly perform the execution action. This simplifies a processing procedure.

The determining module 52 is configured to determine, according to the endpoint identifier of the destination VTEP, whether the network device 5000 is a destination network device corresponding to the endpoint identifier of the destination VTEP.

The generation module 53 is configured to generate the reporting message according to the detection packet if the network device 5000 is the destination network device corresponding to the endpoint identifier of the destination VTEP.

The sending module 54 is configured to send the reporting message to the controller.

The network device 5000 in this embodiment may be any level of network device. An operation step performed by the network device corresponding to the endpoint identifier of the destination VTEP is different from an operation step performed by any other level of network device. The network device corresponding to the endpoint identifier of the destination VTEP only needs to send the reporting message to the controller without replicating and forwarding the detection packet. Therefore, whether the network device 5000 is the network device corresponding to the endpoint identifier of the destination VTEP needs to be determined herein.

The generation module 53 is further configured to replicate, by the network device 5000, the detection packet and generate the reporting message if the network device 5000 is not the destination network device corresponding to the endpoint identifier of the destination VTEP.

The sending module 54 is further configured to send the reporting message to the controller, and forward the detection packet till the detection packet reaches the destination network device.

Packet forwarding between network devices is automatically performed according to a source port value obtained by means of calculation. However, the network device 5000 in this embodiment of the present disclosure further needs to replicate the detection packet when performing packet forwarding. This is because the network device 5000 in this embodiment of the present disclosure not only needs to forward the detection packet, but also needs to encapsulate the detection packet in a reporting message and send the reporting message to the controller.

In the other approaches, which path is used for packet forwarding between network devices is unknown. This problem needs to be resolved in this embodiment of the present disclosure. That is, the detection packet passes through each level of network device, and each level of network device sends a reporting message to the controller using a packet-in interface. The reporting message includes the replicated detection packet, an IP address of a network device sending the reporting message, an inbound interface number of a network device receiving the detection packet, and an outbound interface number of a network device forwarding the detection packet and/or sending the reporting message.

It should be noted that one network device has multiple interface numbers. Which interfaces of which network device the detection packet is received and sent from need to be determined herein.

After receiving an outbound interface number and inbound interface number of each level of network device, the controller may obtain, according to the interface numbers, a detected network path, that is, learn which network devices the simulated detection packet passes through in sequence.

The network device 5000 provided in this embodiment of the present disclosure forwards, level by level, the detection packet that is constructed by the controller according to the detection request, and reports, to the controller level by level, the IP address and the numbers of outbound and inbound interfaces through which the detection packet passes. Therefore, the controller can find a real service path by means of detection.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited. The computer-readable medium may include a RAM, a read-only memory (ROM), an electrically erasable programmable ROM (EEPROM), a compact disc ROM (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. The foregoing combination should also be included in the protection scope of the computer-readable medium.

In summary, what is described above is merely examples of the embodiments of the technical solutions of the present disclosure, but is not intended to limit the protection scope of the present disclosure. All modifications, equivalent substitutions and improvements made without departing from the principle of the present disclosure shall fall within the protection scope of the present disclosure.

What is claimed is:

1. A path detection method implemented by a controller in a virtual extensible local area network (VxLAN), the path detection method comprising:
    constructing a detection packet according to a detection request from a user, the detection packet comprising an identifier indicating a path detection service, an endpoint identifier of a source VxLAN tunnel endpoint (VTEP), an endpoint identifier of a destination VTEP, a source port value, a path detection type, and an Internet Protocol (IP) address of a first network device corresponding to the endpoint identifier of the source VTEP;
    sending the detection packet to the first network device;
    receiving, from the first network device, a first reporting message comprising the detection packet, the IP address of the first network device, a hop count, and outbound and inbound interface numbers of the first network device;
    receiving reporting messages from all levels of network devices from the source VTEP to the destination VTEP, the reporting messages comprising the first reporting message and a second reporting message from a second network device corresponding to the endpoint identifier of the destination VTEP;
    screening out, according to the reporting messages from all levels of network devices, one pair of outbound interface number and inbound interface number from a plurality of reporting messages comprising a same IP address and a same hop count, wherein hop counts in the reporting messages from all levels of network devices progressively and sequentially decrease from the first network device to the second network device;
    sorting, according to the hop counts in the reporting messages from all levels of network devices, all groups obtained after screening and that are of IP addresses, outbound interface numbers, and inbound interface numbers;
    obtaining a network path according to all groups obtained after screening and sorting and that are of IP addresses, outbound interface numbers, and inbound interface numbers; and
    providing the network path to the user.

2. The path detection method of claim 1, wherein the detection request comprises an IP address of a source virtual machine, an IP address of a destination virtual machine, and a protocol type identifier, and wherein the method further comprises:
    capturing a target packet according to the IP address of the source virtual machine, the IP address of the destination virtual machine, and the protocol type identifier in the detection request;
    obtaining a port number of the source virtual machine of the target packet and a port number of the destination virtual machine of the target packet to obtain 5-tuple information, the 5-tuple information comprising the IP address of the source virtual machine, the IP address of the destination virtual machine, the protocol type identifier, the port number of the source virtual machine, and the port number of the destination virtual machine;
    determining the source port value according to the 5-tuple information;
    determining the endpoint identifier of the source VTEP according to the IP address of the source virtual machine;
    determining the endpoint identifier of the destination VTEP according to the IP address of the destination virtual machine;
    obtaining the IP address of the first network device corresponding to the endpoint identifier of the source VTEP; and
    determining, according to the detection request, that the path detection type comprises path detection between virtual machines.

3. The path detection method of claim 1, wherein the detection request comprises the endpoint identifier of the source VTEP and the endpoint identifier of the destination VTEP, and wherein the method further comprises:
    setting the source port value, the source port value progressively increasing according to a sum of an expected quantity of paths between the source VTEP and the destination VTEP and a specified margin quantity, the expected quantity of paths comprising a path quantity known to the user, the specified margin quantity comprising a quantity specified when path detection is performed and is greater than the expected quantity of paths, and the specified margin quantity further comprising a positive integer; and
    determining, according to the detection request, that the path detection type comprises path detection between VTEPs.

4. The path detection method of claim 1, wherein the detection packet further comprises a detection instance identifier identifying different path detection, and wherein the method further comprises recording a received IP address, outbound interface number, and inbound interface number of each network path according to the detection instance identifier.

5. A controller comprising:
    a processor configured to construct a detection packet according to a detection request from a user, the detection packet comprising an identifier indicating a path detection service, an endpoint identifier of a source virtual extensible local area network (VxLAN) tunnel endpoint (VTEP), an endpoint identifier of a destination VTEP, a source port value, a path detection type, and an Internet Protocol (IP) address of a first network device corresponding to the endpoint identifier of the source VTEP;
    a transmitter coupled to the processor and configured to send the detection packet to the first network device; and
    a receiver coupled to the processor and the transmitter and configured to:

receive from the first network device a first reporting message comprising the detection packet, the IP address of the first network device, a hop count, and outbound and inbound interface numbers of the first network device; and receive reporting messages from all levels of network devices from the source VTEP to the destination VTEP, the reporting message comprising the first reporting message and a second reporting message from a second network device, wherein the processor is further configured to:

screen out, according to the reporting messages from all levels of network devices, one pair of outbound interface number and inbound interface number from a plurality of reporting messages comprising a same IP address and a same hop count, wherein hop counts in the reporting messages from all levels of network devices progressively and sequentially decrease from the first network device to the second network device;

sort, according to the hop count in the reporting messages from all levels of network devices, all groups obtained after screening and that are of IP addresses, outbound interface numbers, and inbound interface numbers;

obtain a network path according to each group obtained after screening and sorting and that is of an IP address, an outbound interface number, and an inbound interface number; and provide the network path to the user.

6. The controller of claim 5, wherein the detection request comprises an IP address of a source virtual machine, an IP address of a destination virtual machine, and a protocol type identifier, and wherein the processor is further configured to:

capture a target packet according to the IP address of the source virtual machine, the IP address of the destination virtual machine, and the protocol type identifier in the detection request;

obtain a port number of the source virtual machine of the target packet and a port number of the destination virtual machine of the target packet to obtain 5-tuple information, the 5-tuple information comprising the IP address of the source virtual machine, the IP address of the destination virtual machine, the protocol type identifier, the port number of the source virtual machine, and the port number of the destination virtual machine;

determine the source port value according to the 5-tuple information;

determine the endpoint identifier of the source VTEP according to the IP address of the source virtual machine;

determine the endpoint identifier of the destination VTEP according to the IP address of the destination virtual machine;

obtain the IP address of the first network device corresponding to the endpoint identifier of the source VTEP; and determine, according to the detection request, that the path detection type comprises path detection between virtual machines.

7. The controller of claim 5, wherein the detection request comprises the endpoint identifier of the source VTEP and the endpoint identifier of the destination VTEP, and wherein the processor is further configured to:

set the source port value, the source port value progressively increasing according to a sum of an expected quantity of paths between the source VTEP and the destination VTEP and a specified margin quantity, the expected quantity of paths comprising a path quantity known to the user, the specified margin quantity comprising a quantity specified when path detection is performed and is greater than the expected quantity of paths, and the specified margin quantity further comprising a positive integer; and determine, according to the detection request, that the path detection type comprises path detection between VTEPs.

8. The controller of claim 5, wherein the detection packet further comprises a detection instance identifier identifying different path detection, and wherein the processor is further configured to record a received IP address, outbound interface number, and inbound interface number of each network path according to the detection instance identifier.

9. A system comprising:

a controller comprising:

a processor configured to construct a detection packet according to a detection request from a user, the detection packet comprising an identifier indicating a path detection service, an endpoint identifier of a source virtual extensible local area network (VxLAN) tunnel endpoint (VTEP), an endpoint identifier of a destination VTEP, a source port value, a path detection type, and an Internet Protocol (IP) address of a first network device corresponding to the endpoint identifier of the source VTEP, wherein the plurality of network devices comprises all levels of network devices from the source VTEP to the destination VTEP, wherein all levels of network devices comprises the first network device, and a second network device corresponding to the endpoint identifier of the destination VTEP;

a transmitter coupled to the processor and configured to send the detection packet to the first network device; and a receiver coupled to the processor and the transmitter and configured to:

receive from the first network device a first reporting message comprising the detection packet, the IP address of the first network device, a hop count, and outbound and inbound interface numbers of the first network device; and receive reporting messages from all levels of network devices, the reporting messages comprising the first reporting message, and a second reporting message from the second network device, wherein the processor is further configured to:

screen out, according to the reporting messages from all levels of network device, one pair of outbound interface number and inbound interface number from a plurality of reporting messages comprising a same IP address and a same hop count, wherein hop counts in the reporting messages from all levels of network devices progressively and sequentially decrease from the first network device corresponding to the endpoint identifier of the source VTEP to the second network device corresponding to the endpoint identifier of the destination VTEP;

sort, according to the hop counts in the reporting messages from all levels of network devices, all groups obtained after screening and that are of IP addresses, outbound interface numbers, and inbound interface numbers;

obtain a network path according to each group obtained after screening and sorting and that is of an IP address, an outbound interface number, and an inbound interface number; and provide the network path to the user;

wherein each network device comprises:

a receiver configured to receive a detection packet constructed by a controller according to a detection request from a user, and the detection packet comprising an identifier indicating a path detection service, an endpoint identifier of a source virtual extensible local area network (VxLAN) tunnel endpoint (VTEP), an endpoint identifier of a destination VTEP, a source port value, a path detection type, and an Internet Protocol (IP) address of a source network device corresponding to the endpoint identifier of the source VTEP;

a processor coupled to the receiver and configured to:

determine, according to the endpoint identifier of the destination VTEP, whether the network device comprises a destination network device corresponding to the endpoint identifier of the destination VTEP;

generate a reporting message according to the detection packet when the network device comprises the destination network device; and replicate the detection packet and generate the reporting message when the network device does not comprise the destination network device; and a transmitter coupled to the receiver and the processor and configured to:

send the reporting message to the controller, wherein the reporting message comprises the detection packet, an IP address of the network device, a hop count, and numbers of an outbound interface and an inbound interface of the network device and through which the detection packet passes; and forward the detection packet until the detection packet reaches the destination network device.

* * * * *